(12) United States Patent
Yu et al.

(10) Patent No.: US 10,893,049 B2
(45) Date of Patent: Jan. 12, 2021

(54) ACCESS POINT NAME AUTHORIZATION METHOD, APPARATUS, AND SYSTEM

(71) Applicant: Huawei Technologies Co., Ltd., Guangdong (CN)

(72) Inventors: Youyang Yu, Shanghai (CN); Rongchun Gao, Shenzhen (CN); Hua Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 15/789,359

(22) Filed: Oct. 20, 2017

(65) Prior Publication Data
US 2018/0041903 A1    Feb. 8, 2018

Related U.S. Application Data

(63) Continuation of application No. PCT/CN2015/077177, filed on Apr. 22, 2015.

(51) Int. Cl.
*H04W 12/06* (2009.01)
*H04W 12/08* (2009.01)
(Continued)

(52) U.S. Cl.
CPC .......... *H04L 63/101* (2013.01); *H04L 63/107* (2013.01); *H04W 12/06* (2013.01);
(Continued)

(58) Field of Classification Search
CPC ..... H04W 12/08; H04W 12/00; H04W 48/16; H04W 48/17; H04W 12/06; H04W 8/265;
(Continued)

(56) References Cited

U.S. PATENT DOCUMENTS 7,324,489 B1 * 1/2008 Iyer ...................... H04W 76/12
 370/338
7,761,913 B2 * 7/2010 Grandmaitre ........... H04L 63/08
 726/12
(Continued)

FOREIGN PATENT DOCUMENTS

CN          1627842 A      6/2005
CN        101248640 A      8/2008
(Continued)

OTHER PUBLICATIONS

Interworking between Next Generation Fixed and 3GPP Wireless Networks Alan Kavanagh, Kalyani Bogineni, Roberto David Carnero Ros pp. 68; August (Year: 2012).*
(Continued)

*Primary Examiner* — Jeffrey C Pwu
*Assistant Examiner* — Ali H. Cheema
(74) *Attorney, Agent, or Firm* — Conley Rose, P.C.

(57) ABSTRACT

Embodiments of the present disclosure provide an access point name (APN) authorization method, apparatus, and system. The APN authorization method includes: determining, by a network device, a target APN of user equipment UE and a type of an access network that the UE currently accesses; obtaining, by the network device, information about an authorized access network type corresponding to the target APN of the UE; and determining, by the network device according to the type of the access network that the UE currently accesses and the information about the authorized access network type corresponding to the target APN of the UE, whether the target APN of the UE is authorized. In the present disclosure, when APN authorization determining is performed, an operator can appropriately control the APN which the UE is allowed to access.

17 Claims, 8 Drawing Sheets

A network device determines a target APN of user equipment UE and a type of an access network that the UE currently accesses ~ 301

The network device obtains information about an authorized access network type corresponding to the target APN of the UE ~ 302

The network device determines, according to the type of the access network that the UE currently accesses and the information about the authorized access network type corresponding to the target APN of the UE, whether the target APN of the UE is authorized ~ 303

(51) Int. Cl.
*H04W 48/00* (2009.01)
*H04W 48/16* (2009.01)
*H04L 29/06* (2006.01)
*H04W 56/00* (2009.01)
*H04W 12/00* (2009.01)
*H04W 8/26* (2009.01)
*H04L 29/08* (2006.01)

(52) U.S. Cl.
CPC ....... *H04W 12/0804* (2019.01); *H04W 48/17* (2013.01); *H04L 63/0892* (2013.01); *H04L 63/10* (2013.01); *H04L 63/164* (2013.01); *H04L 67/143* (2013.01); *H04W 8/265* (2013.01); *H04W 12/00* (2013.01); *H04W 12/08* (2013.01); *H04W 48/16* (2013.01); *H04W 56/00* (2013.01)

(58) Field of Classification Search
CPC . H04W 36/0033; H04W 56/00; H04W 76/12; H04L 63/10; H04L 63/107; H04L 63/101; H04L 63/0892; H04L 63/164; H04L 45/74; H04L 61/205; H04L 63/08; H04L 12/66; H04L 67/143
USPC ....... 726/4, 12; 713/171; 370/401, 338, 331, 370/329, 328
See application file for complete search history.

(56) References Cited

U.S. PATENT DOCUMENTS

| | | | | |
|---|---|---|---|---|
| 9,137,231 | B2* | 9/2015 | Naslund | H04L 63/08 |
| 9,220,118 | B1* | 12/2015 | Ramamurthy | H04W 76/10 |
| 9,521,077 | B2* | 12/2016 | Carames | H04W 48/20 |
| 2006/0126584 | A1 | 6/2006 | Zhang et al. | |
| 2006/0168655 | A1* | 7/2006 | Grandmaitre | H04L 63/08 726/12 |
| 2008/0198861 | A1* | 8/2008 | Makela | H04L 67/143 370/401 |
| 2009/0201883 | A1* | 8/2009 | Yan | H04W 36/0033 370/331 |
| 2011/0088080 | A1* | 4/2011 | Stupar | H04W 12/08 726/4 |
| 2011/0099604 | A1* | 4/2011 | Zhou | H04L 12/14 726/1 |
| 2011/0103310 | A1* | 5/2011 | Stojanovski | H04L 12/66 370/328 |
| 2011/0170517 | A1* | 7/2011 | Bakker | H04W 36/0033 370/331 |
| 2011/0216743 | A1* | 9/2011 | Bachmann | H04L 63/164 370/331 |
| 2011/0225632 | A1* | 9/2011 | Ropolyi | H04W 48/16 726/4 |
| 2012/0020343 | A1* | 1/2012 | Sugizaki | H04W 48/17 370/338 |
| 2013/0034108 | A1* | 2/2013 | Kaippallimalil | H04W 48/17 370/401 |
| 2013/0097418 | A1 | 4/2013 | Bhatt et al. | |
| 2013/0121322 | A1 | 5/2013 | Salkintzis | |
| 2013/0279401 | A1* | 10/2013 | Sander | H04W 8/06 370/328 |
| 2013/0290722 | A1* | 10/2013 | Kall | H04L 12/4633 713/171 |
| 2014/0248869 | A1* | 9/2014 | Chen | H04W 8/30 455/424 |
| 2014/0341138 | A1* | 11/2014 | Roeland | H04L 61/2015 370/329 |
| 2014/0355541 | A1* | 12/2014 | Liu | H04W 76/12 370/329 |
| 2015/0055510 | A1 | 2/2015 | Gao et al. | |
| 2015/0350912 | A1* | 12/2015 | Head | H04W 12/08 726/4 |
| 2016/0119347 | A1 | 4/2016 | Liu et al. | |
| 2016/0295385 | A1* | 10/2016 | Wang | H04W 4/90 |
| 2017/0164185 | A1* | 6/2017 | Betti | H04W 8/265 |

FOREIGN PATENT DOCUMENTS

| | | |
|---|---|---|
| CN | 101248640 B * | 11/2012 |
| CN | 103415044 A | 11/2013 |
| CN | 103517252 A | 1/2014 |
| CN | 103517378 A | 1/2014 |
| EP | 2348782 B1 | 10/2014 |
| JP | 2013507884 A | 3/2013 |
| JP | 2013219635 A | 10/2013 |
| KR | 20140096349 A | 8/2014 |

OTHER PUBLICATIONS

3GPP TS 29.272 V13.1.0 (Mar. 2015), 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13), 136 pages.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13)"; 3GPP TS 29.272 V13.1.0; Mar. 2015; 136 pages.

Lai et al.; "Secure machine-type communications in LTE networks"; Wireless Communications and Mobile Computing; vol. 16; Jul. 17, 2015; 15 pages.

* cited by examiner

ACCESS POINT NAME AUTHORIZATION METHOD, APPARATUS, AND SYSTEM

CROSS-REFERENCE TO RELATED APPLICATIONS

This application is a continuation of International Application No. PCT/CN2015/077177, filed on Apr. 22, 2015, the disclosure of which is hereby incorporated by reference in its entirety.

TECHNICAL FIELD

Embodiments of the present application relate to communications technologies, and in particular, to an access point name (APN) authorization method, apparatus, and system.

BACKGROUND

Types of non-3rd Generation Partnership Project (Non 3GPP) access networks may be divided into Code Division Multiple Access (CDMA) 2000, Worldwide Interoperability for Microwave Access (WiMAX), Wireless Local Area Network (WLAN), and the like.

From a perspective of whether an access network is trusted, the non-3GPP access network is divided into a trusted non-3GPP access network and an untrusted non-3GPP access network. When user equipment (UE) accesses the non-3GPP access network (for example, an untrusted non-3GPP access network), an untrusted non-3GPP access gateway (for example, an evolved packet data gateway (ePDG)) sends to an Authentication, Authorization, and Accounting (AAA) server an authentication and authorization request. (The authentication and authorization request may include an APN that the UE requests to access. If the authentication and authorization request does not include the APN, a default APN in subscription data of the UE is used). The AAA server obtains the subscription data (the subscription data includes the APN that the UE is allowed to authorize) of the UE from a home subscriber server (HSS). The AAA server determines, according to the subscription data of the UE and the APN that the UE requests to access, whether the APN that the UE requests to access is authorized. Specifically, when the subscription data includes the APN that the UE requests to access, the AAA server determines that the APN that the UE requests to access is authorized.

However, in the prior art, there is a problem that, when APN authorization determining is performed, an operator cannot appropriately control an APN that the UE is allowed to authorize.

SUMMARY

Embodiments of the present disclosure provide an access point name authorization method, apparatus, and system, to resolve a prior-art problem that, when APN authorization determining is performed, an operator cannot appropriately control an APN that the UE is allowed to authorize.

According to a first aspect, an embodiment of the present disclosure provides an APN authorization method, including:

determining, by a network device, a target APN of UE and a type of an access network that the UE currently accesses;

obtaining, by the network device, information about an authorized access network type corresponding to the target APN of the UE; and determining, by the network device according to the type of the access network that the UE currently accesses and the information about the authorized access network type corresponding to the target APN of the UE, whether the target APN of the UE is authorized.

With reference to the first aspect, in a first possible implementation of the first aspect, the determining, by the network device according to the type of the access network that the UE currently accesses and the information about the authorized access network type corresponding to the target APN of the UE, whether the target APN of the UE is authorized includes:

if determining, according to the information about the authorized access network type corresponding to the target APN of the UE, that the type of the access network that the UE currently accesses belongs to the authorized access network type corresponding to the target APN of the UE, determining, by the network device, that the target APN of the UE is authorized; or if determining, according to the information about the authorized access network type corresponding to the target APN of the UE, that the type of the access network that the UE currently accesses does not belong to the authorized access network type corresponding to the target APN of the UE, determining, by the network device, that the target APN of the UE is not authorized.

With reference to the first aspect or the first possible implementation of the first aspect, in a second possible implementation of the first aspect, before the determining, by the network device according to the type of the access network that the UE currently accesses and the information about the authorized access network type corresponding to the target APN of the UE, whether the target APN of the UE is authorized, the method further includes:

determining, by the network device, that subscription data of the UE includes the target APN of the UE.

With reference to any one of the first aspect or the first or the second implementation of the first aspect, in a third possible implementation of the first aspect, if the network device determines, according to the type of the access network that the UE currently accesses and the information about the authorized access network type corresponding to the target APN of the UE, that the target APN of the UE is not authorized, the method further includes:

sending, by the network device, an authorization failure cause to the UE, where the authorization failure cause is used to indicate that the target APN of the UE fails to be authorized in the type of the access network that the UE currently accesses.

With reference to any one of the first aspect or the first to the third possible implementations of the first aspect, in a fourth possible implementation of the first aspect, the obtaining, by the network device, information about an authorized access network type corresponding to the target APN of the UE includes:

receiving, by the network device, the subscription data of the UE sent by a home subscriber server HSS, where the subscription data of the UE includes the information about the authorized access network type corresponding to the target APN of the UE.

With reference to the fourth possible implementation of the first aspect, in a fifth possible implementation of the first aspect, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

With reference to any one of the first aspect or the first to the fifth possible implementations of the first aspect, in a sixth possible implementation of the first aspect, the network device is an AAA server or a non-3GPP access gateway.

With reference to the fourth or the fifth possible implementation of the first aspect, in a seventh possible implementation of the first aspect, if the network device is an AAA server, before the receiving, by the network device, the subscription data of the UE sent by an HSS, the method further includes:

receiving, by the network device, an authentication response message sent by the HSS, where the authentication response message includes an authentication failure cause of the UE; and sending, by the network device, the authentication failure cause of the UE to the UE.

According to a second aspect, an embodiment of the present disclosure provides an APN authorization method, including:

sending, by an HSS, subscription data of user equipment UE to a network device, where the subscription data of the UE includes information about an authorized access network type corresponding to a target APN of the UE, so that the network device determines, according to the information about the authorized access network type corresponding to the target APN of the UE and a type of an access network that the UE currently accesses, whether the target APN of the UE is authorized.

With reference to the second aspect, in a first possible implementation of the second aspect, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

According to a third aspect, an embodiment of the present disclosure provides an APN authorization method, including:

determining, by an HSS, a type of an access network that user equipment UE currently accesses;

updating, by the HSS, subscription data of the UE according to the type of the access network that the UE currently accesses, to obtain updated subscription data, where the subscription data of the UE includes at least one APN and information about an authorized access network type corresponding to the at least one APN, and the updated subscription data includes information about an authorized APN in the type of the access network that the UE currently accesses; and sending, by the HSS, the updated subscription data to the network device.

With reference to the third aspect, in a first possible implementation of the third aspect, in the subscription data of the UE includes the information about the authorized access network type corresponding to the at least one APN in the following manner:

an APN configuration parameter corresponding to each of the at least one APN in the subscription data includes the authorized access network type; or an APN configuration parameter corresponding to each of the at least one APN in the subscription data includes a non-authorized access network type; or an APN configuration parameter corresponding to each of the at least one APN in the subscription data includes an authorization identifier corresponding to the type of the access network that the UE currently accesses, where the authorization identifier is used to indicate that the APN corresponding to the APN configuration parameter is authorized or not authorized in the type of the access network that the UE currently accesses.

According to a fourth aspect, an embodiment of the present disclosure provides an APN authorization method, including:

receiving, by a network device, updated subscription data sent by a home subscriber server HSS, where the updated subscription data includes information about an authorized APN in a type of an access network that user equipment UE currently accesses; and determining, by the network device according to a target APN of the UE and the information about the authorized APN in the type of the access network that the UE currently accesses, whether the target APN of the UE is authorized.

According to a fifth aspect, an embodiment of the present disclosure provides an APN authorization method, including:

receiving, by UE, an authorization failure cause sent by a network device, where the authorization failure cause is used to indicate that a target APN of the UE fails to be authorized in a type of an access network that the UE currently accesses; and sending, by the UE, a first connection request message to a gateway of the access network that the UE currently accesses, where the first connection request message includes an APN requested by the UE, and the APN requested by the UE is different from the target APN.

With reference to the fifth aspect, in a first possible implementation of the fifth aspect, the method further includes:

receiving, by the UE, an authentication failure cause of the UE sent by the network device, where the authentication failure cause includes that an access network type does not allow access or a visited public land mobile network VPLMN does not allow access; and sending, by the UE, a second connection request message to a gateway different from the gateway of the access network that the UE currently accesses.

According to a sixth aspect, an embodiment of the present disclosure provides an APN authorization apparatus, where the apparatus is a network device, and the apparatus includes:

a determining module, configured to determine a target APN of UE and a type of an access network that the UE currently accesses; and an obtaining module, configured to obtain information about an authorized access network type corresponding to the target APN of the UE, where the determining module is further configured to determine, according to the type of the access network that the UE currently accesses and the information about the authorized access network type corresponding to the target APN of the UE, whether the target APN of the UE is authorized.

With reference to the sixth aspect, in a first possible implementation of the sixth aspect, the determining module is specifically configured to:

if determining, according to the information about the authorized access network type corresponding to the target APN of the UE, that the type of the access network that the UE currently accesses belongs to the authorized access network type corresponding to the target APN of the UE, determine that the target APN of the UE is authorized; or if determining, according to the information about the authorized access network type corresponding to the target APN of the UE, that the type of the access network that the UE currently accesses does not belong to the authorized access network type corresponding to the target APN of the UE, determine that the target APN of the UE is not authorized.

With reference to the sixth aspect or the first possible implementation of the sixth aspect, in a second possible implementation of the sixth aspect, the determining module is further configured to determine that subscription data of the UE includes the target APN of the UE.

With reference to any one of the sixth aspect or the first or the second possible implementation of the sixth aspect, in a third possible implementation of the sixth aspect, the apparatus further includes a first transmitter, where if the determining module determines, according to the type of the access network that the UE currently accesses and the information about the authorized access network type corresponding to the target APN of the UE, that the target APN of the UE is not authorized, the first transmitter is configured to send an authorization failure cause to the UE, where the authorization failure cause is used to indicate that the target APN of the UE fails to be authorized in the type of the access network that the UE currently accesses.

With reference to any one of the sixth aspect or the first to the third possible implementations of the sixth aspect, in a fourth possible implementation of the sixth aspect, the obtaining module is specifically configured to:

receiving the subscription data of the UE sent by a home subscriber server HSS, where the subscription data of the UE includes the information about the authorized access network type corresponding to the target APN of the UE.

With reference to the fourth possible implementation of the sixth aspect, in a fifth possible implementation of the sixth aspect, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

With reference to any one of the sixth aspect or the first to the fifth possible implementations of the sixth aspect, in a sixth possible implementation of the sixth aspect, the network device is an AAA server or a non-3GPP access gateway.

With reference to the fourth or the fifth possible implementation of the sixth aspect, in a seventh possible implementation of the sixth aspect, the apparatus further includes a second transmitter, where if the network device is an AAA server, the obtaining module is further configured to receive an authentication response message sent by the HSS, where the authentication response message includes an authentication failure cause of the UE; and the second transmitter is configured to send the authentication failure cause of the UE to the UE.

According to a seventh aspect, an embodiment of the present disclosure provides an APN authorization apparatus, where the apparatus is an HSS, and the apparatus includes:

a transmitter, configured to send subscription data of user equipment UE to a network device, where the subscription data of the UE includes information about an authorized access network type corresponding to a target APN of the UE, so that the network device determines, according to the information about the authorized access network type corresponding to the target APN of the UE and a type of an access network that the UE currently accesses, whether the target APN of the UE is authorized.

With reference to the seventh aspect, in a first possible implementation of the seventh aspect, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

According to an eighth aspect, an embodiment of the present disclosure provides an APN authorization apparatus, where the apparatus is an HSS, and the apparatus includes:

a determining module, configured to determine a type of an access network that user equipment UE currently accesses;

an updating module, configured to update subscription data of the UE according to the type of the access network that the UE currently accesses, to obtain updated subscription data, where the subscription data of the UE includes at least one APN and information about an authorized access network type corresponding to the at least one APN, and the updated subscription data includes information about an authorized APN in the type of the access network that the UE currently accesses; and a transmitter, configured to send the updated subscription data to the network device.

With reference to the eighth aspect, in a first possible implementation of the eighth aspect, the subscription data of the UE includes the information about the authorized access network type corresponding to the at least one APN in the following manner:

an APN configuration parameter corresponding to each of the at least one APN in the subscription data includes the authorized access network type; or an APN configuration parameter corresponding to each of the at least one APN in the subscription data includes a non-authorized access network type; or an APN configuration parameter corresponding to each of the at least one APN in the subscription data includes an authorization identifier corresponding to the type of the access network that the UE currently accesses, where the authorization identifier is used to indicate that the APN corresponding to the APN configuration parameter is authorized or not authorized in the type of the access network that the UE currently accesses.

According to a ninth aspect, an embodiment of the present disclosure provides an APN authorization apparatus, where the apparatus is a network device, and the apparatus includes:

a receiver, configured to receive updated subscription data sent by a home subscriber server HSS, where the updated subscription data includes information about an authorized APN in a type of an access network that user equipment UE currently accesses; and a determining module, configured to determine, according to a target APN of the UE and the information about the authorized APN in the type of the access network that the UE currently accesses, whether the target APN of the UE is authorized.

According to a tenth aspect, an embodiment of the present disclosure provides an APN authorization apparatus, where the apparatus is UE, and the apparatus includes:

a receiver, configured to receive an authorization failure cause sent by a network device, where the authorization failure cause is used to indicate that a target APN of the UE fails to be authorized in a type of an access network that the UE currently accesses; and a transmitter, configured to send a first connection request message to a gateway of the access network that the UE currently accesses, where the first connection request message includes an APN requested by the UE, and the APN requested by the UE is different from the target APN.

With reference to the tenth aspect, in a first possible implementation of the tenth aspect, the receiver is further configured to receive an authentication failure cause of the UE sent by the network device, where the authentication failure cause includes that an access network type does not allow access or a visited public land mobile network VPLMN does not allow access; and the transmitter is further configured to send a second connection request message to a gateway different from the gateway of the access network that the UE currently accesses.

According to an eleventh aspect, an embodiment of the present disclosure provides an APN authorization system, including the network device according to any one of the sixth aspect or the first to the seventh implementations of the sixth aspect, and the HSS according to the seventh aspect or the first implementation of the seventh aspect, and UE.

With reference to the eleventh aspect, in a first possible implementation of the eleventh aspect, the UE is the UE according to the tenth aspect or the first implementation of the tenth aspect.

According to a twelfth aspect, an embodiment of the present disclosure provides an APN authorization system, including the HSS according to the eighth aspect or the first implementation of the eighth aspect, the network device according to the ninth aspect, and UE.

With reference to the twelfth aspect, in a first possible implementation of the twelfth aspect, the UE is the UE according to the tenth aspect or the first implementation of the tenth aspect.

The embodiments of the present disclosure provide an access point name authorization method, apparatus, and system. A network device determines, according to a type of an access network that UE currently accesses and information about an authorized access network type corresponding to a target APN of the UE, whether the target APN of the UE is authorized, so that when performing APN authorization determining, the network device can determine, according to the information about the authorized access network type corresponding to the target APN of the UE, whether the target APN of the UE in the type of the access network that the UE currently accesses is authorized. In this way, when performing APN authorization determining, the network device can consider both the target APN of the UE and the type of the access network that the UE currently accesses, and an operator can control, according to the type of the access network that the UE currently accesses, an APN that the UE is allowed to access in the type of the access network that the UE currently accesses. This resolves a prior-art problem that, when APN authorization determining is performed, an operator cannot appropriately control the APN that the UE is allowed to access.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
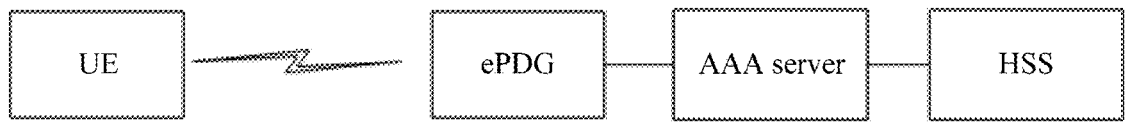
FIG. 1 is a schematic diagram of an application scenario of an APN authorization method according to the present disclosure.

FIG. 1 is a schematic diagram of an application scenario of an APN authorization method according to the present disclosure. As shown in FIG. 1, a UE, an ePDG, an AAA server, and an HSS are included in the application scenario. When the UE accesses an untrusted WLAN access network, the ePDG sends, to the AAA server, an authentication and authorization request message. (The authentication and authorization request message may include an APN that the UE requests to access; and when no APN is included, a default APN in subscription data of the UE is used). The AAA server obtains the subscription data of the UE from the HSS. The subscription data includes an APN that the UE is allowed to authorize. When the subscription data includes a target APN of the UE (when the authentication and authorization request message includes an APN, the APN is used as the target APN of the UE; and when no APN is included, the default APN in the subscription data is used as the target APN of the UE), the AAA server determines that the target APN of the UE is authorized; otherwise, the AAA server determines that the target APN of the UE is not authorized. The subscription data of the UE includes only an APN that the UE is allowed to access, and does not reflect a relationship between an APN that the UE is allowed to access and a type of access network. Therefore, there is a problem that, when the AAA server performs APN authorization determining, an operator cannot appropriately control the APN that the UE is allowed to access.

Figure 2:
FIG. 2 is a schematic diagram of another application scenario of an APN authorization method according to the present disclosure.

FIG. 2 is a schematic diagram of another application scenario of an APN authorization method according to the present disclosure. As shown in FIG. 2, a UE, a trusted WLAN access network (TWAN), an AAA server, and an HSS are included in the application scenario. When the UE accesses the trusted WLAN access network, the TWAN obtains subscription data of the UE from the HSS. The subscription data includes an APN that the UE is allowed to authorize. When the subscription data includes a target APN of the UE, the TWAN determines that the target APN of the UE is authorized; otherwise, the TWAN determines that the target APN of the UE is not authorized. The subscription data of the UE includes only an APN that the UE is allowed to access, and does not reflect a relationship between an APN that the UE is allowed to access and a type of access network. Therefore, there is a problem that, when the TWAN performs APN authorization determining, an operator cannot appropriately control the APN that the UE is allowed to access.

It should be noted that FIG. 1 and FIG. 2 are merely schematic diagrams of the method according to the present disclosure when a type of non-3GPP access network is an untrusted WLAN and a trusted WLAN respectively. The method of the present disclosure can be applied to any type of non-3GPP access network, such as CDMA2000 or WiMAX. For example, when the type of non-3GPP access network is CDMA2000, an application scenario corresponding to the type is that the network element TWAN shown in FIG. 2 is replaced with a high rate packet data (HRPD) serving gateway (HS-GW), and the HS-GW performs APN authorization determining.

It should be noted that a non-3GPP access gateway in the present disclosure may include the ePDG, the TWAN, the HS-GW, and the like.

Figure 3:
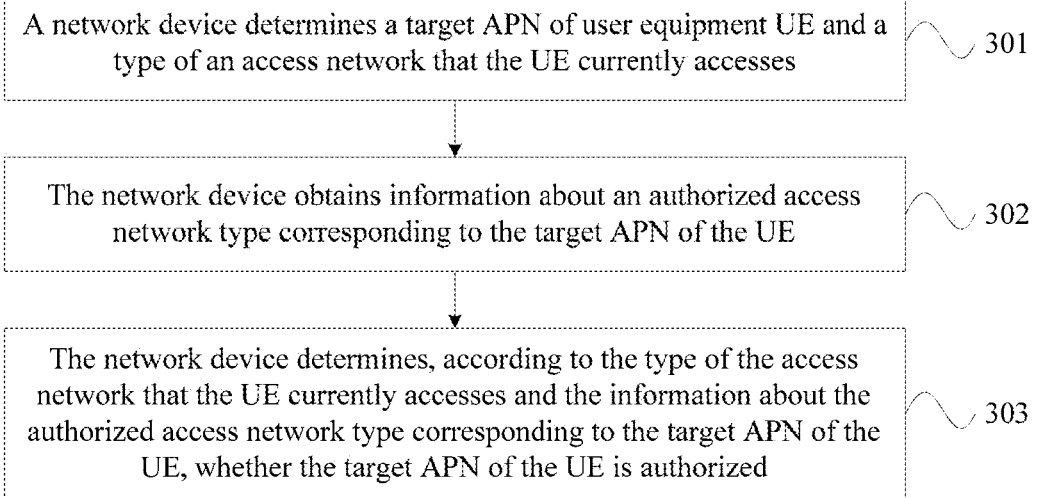
FIG. 3 is a flowchart of Embodiment 1 of an APN authorization method according to the present disclosure.

FIG. 3 is a flowchart of Embodiment 1 of an APN authorization method according to the present disclosure. As shown in FIG. 3, the method in this embodiment may include the following steps.

Step 301. A network device determines a target APN of user equipment UE and a type of an access network that the UE currently accesses.

Optionally, the network device may be an AAA server or a non-3GPP access gateway.

Step 302. The network device obtains information about an authorized access network type corresponding to the target APN of the UE.

It should be noted that the authorized access network type is a type of an access network that the UE is allowed to access.

Step 303. The network device determines, according to the type of the access network that the UE currently accesses and the information about the authorized access network type corresponding to the target APN of the UE, whether the target APN of the UE is authorized.

Optionally, step 303 may be specifically:

if determining, according to the information about the authorized access network type corresponding to the target APN of the UE, that the type of the access network that the UE currently accesses belongs to the authorized access network type corresponding to the target APN of the UE, the network device determines that the target APN of the UE is authorized; or if determining, according to the information about the authorized access network type corresponding to the target APN of the UE, that the type of the access network that the UE currently accesses does not belong to the authorized access network type corresponding to the target APN of the UE, the network device determines that the target APN of the UE is not authorized.

In the prior art, subscription data of UE includes an APN that the UE is allowed to access. When the subscription data of the UE includes a target APN of the UE, it is determined that the target APN of the UE is authorized; otherwise, it is determined that the target APN of the UE is not authorized. In the present disclosure, a network device determines, according to a type of an access network that the UE currently accesses and information about an authorized access network type corresponding to the target APN of the UE, whether the target APN of the UE is authorized.

In the prior art, the subscription data of the UE includes only the APN (an authorized APN) that the UE is allowed to access, and does not reflect a relationship between the APN that the UE is allowed to access and the type of access network. Therefore, there is a problem that, when APN authorization determining is performed, an operator cannot appropriately control the APN that the UE is allowed to access. In the present disclosure, the network device determines, according to the type of the access network that the UE currently accesses and the information about the authorized access network type corresponding to the target APN of the UE, whether the target APN of the UE is authorized, so that when performing APN authorization determining, the network device can determine, according to the information about the authorized access network type corresponding to the target APN of the UE, whether the target APN of the UE in the type of the access network that the UE currently accesses is authorized. In this way, when performing APN authorization determining, the network device can consider both the target APN of the UE and the type of the access network that the UE currently accesses, and an operator can control, according to the type of the access network that the UE currently accesses, the APN that the UE is allowed to access in the type of the access network that the UE currently accesses. This resolves a prior-art problem that, when APN authorization determining is performed, an operator cannot appropriately control the APN that the UE is allowed to access.

Figure 4:
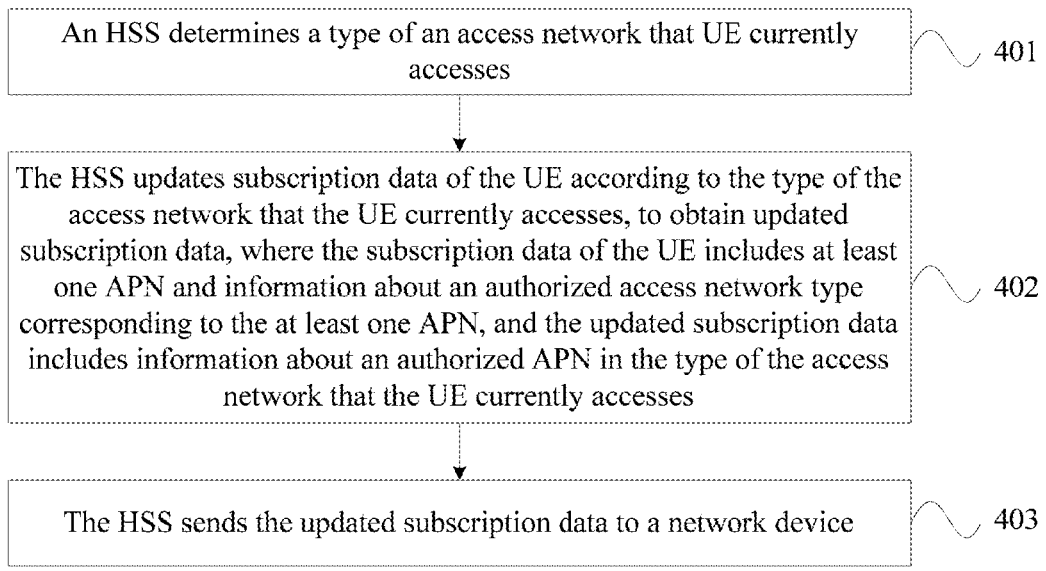
FIG. 4 is a flowchart of Embodiment 2 of an APN authorization method according to the present disclosure.

FIG. 4 is a flowchart of Embodiment 2 of an APN authorization method according to the present disclosure. As shown in FIG. 4, the method in this embodiment may include the following steps.

Step 401. An HSS determines a type of an access network that UE currently accesses.

Step 402. The HSS updates subscription data of the UE according to the type of the access network that the UE currently accesses, to obtain updated subscription data, where the subscription data of the UE includes at least one APN and information about an authorized access network type corresponding to the at least one APN, and the updated subscription data includes information about an authorized APN in the type of the access network that the UE currently accesses.

It should be noted that the authorized APN is an APN that the UE is allowed to access.

Step 403. The HSS sends the updated subscription data to a network device.

Optionally, the network device may be an AAA server or a non-3GPP access gateway.

In the prior art, subscription data of UE stored by an HSS includes an APN that the UE is allowed to access, and the HSS sends the subscription data to a network device, so that the network device performs APN authorization determining. In the present disclosure, the HSS updates the subscription data of the UE according to a type of an access network that the UE currently accesses, to obtain updated subscription data. The subscription data of the UE includes at least one APN and information about an authorized access network type corresponding to the at least one APN, and the updated subscription data includes information about an authorized APN in the type of the access network that the UE currently accesses. The HSS sends the updated subscription data to the network device.

In the prior art, the subscription data of the UE includes only the APN that the UE is allowed to access, and does not reflect a relationship between the APN that the UE is allowed to access and a type of access network. Therefore, there is a problem that, when APN authorization determining is performed, an operator cannot appropriately control the APN that the UE is allowed to access. In the present disclosure, the HSS updates the subscription data of the UE according to the type of the access network that the UE currently accesses, to obtain the updated subscription data. The subscription data of the UE includes at least one APN and the information about an authorized access network type corresponding to the at least one APN. The updated subscription data includes the information about the authorized APN in the type of the access network that the UE currently accesses. The HSS sends the updated subscription data to the network device, so that the subscription data sent by the HSS to the network device includes the information about the authorized APN in the type of the access network that the UE currently accesses, and that the network device can determine, according to a target APN of the UE and the information about the authorized APN in the type of the access network that the UE currently accesses, whether the target APN of the UE is authorized. This resolves a prior-art problem that, when APN authorization determining is performed, an operator cannot appropriately control an APN that the UE is allowed to access.

Figure 5:
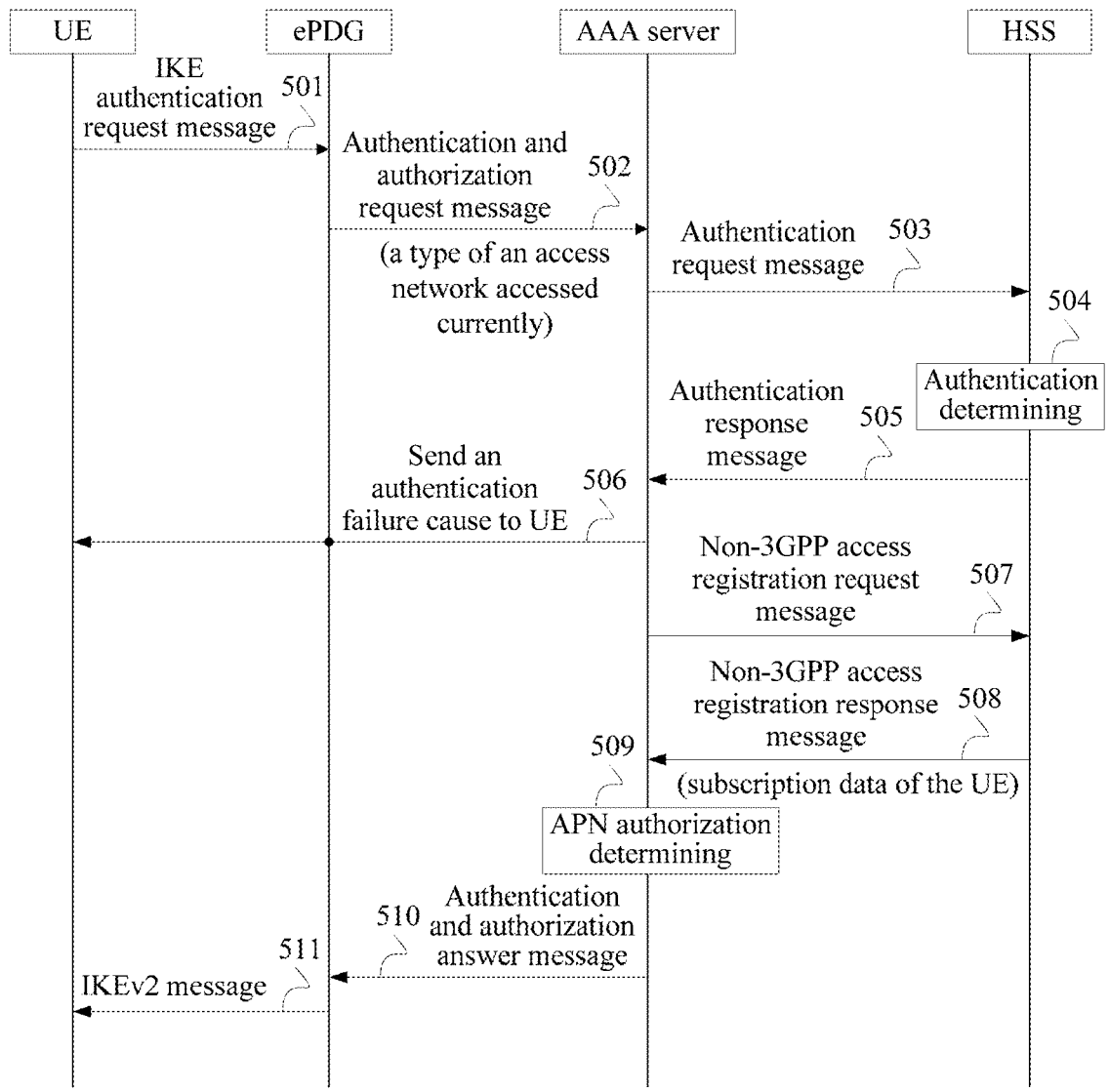
FIG. 5 is a flowchart of Embodiment 3 of an APN authorization method according to the present disclosure.

FIG. 5 is a flowchart of Embodiment 3 of an APN authorization method according to the present disclosure. As shown in FIG. 5, the method in this embodiment may include the following steps.

Step 501. The UE sends an Internet Key Exchange (IKE) authentication request message to an ePDG.

The IKE authentication request message may include a target APN of the UE, or the IKE authentication request message may not include a target APN of the UE. When the IKE authentication request message does not include the target APN of the UE, an AAA server uses a default APN in subscription data of the UE as the target APN of the UE.

Optionally, before the UE sends the IKE authentication request message to the ePDG, the method may further include that the UE sends an IKE initial request message (IKE_SA_INIT request message) to the ePDG.

Step 502. The ePDG sends an authentication and authorization request message to an AAA server.

The authentication and authorization request message may include a type of an access network that the UE currently accesses, an identifier of the UE, and a network identifier.

Optionally, the identifier of the UE may be a network access identifier (NAI). The NAI includes a subscriber persistent identity (IMSI) of the UE. The network identifier may be visited public land mobile network (VPLMN) information.

It should be noted that the type of the access network that the UE currently accesses may be obtained by the ePDG. The ePDG may be a non-3GPP access gateway of an untrusted WLAN. Therefore, the type of the access network that the UE currently accesses may be an untrusted WLAN or a WLAN.

Step 503. The AAA server sends an authentication request message to an HSS.

The authentication request message may include the IMSI of the UE, the network identifier, and the type of the access network that the UE currently accesses.

It should be noted that, before the AAA server sends the authentication request to the HSS, the method may further include that the AAA server determines, according to the IMSI of the UE included in the authentication and authorization request message, whether the AAA server stores context information (including the subscription data and an authentication vector) of the UE. If determining that the AAA server itself has stored the context information of the UE, the AAA server does not send the authentication request message to the HSS (step 503 is not performed), and step 509 is directly performed.

Step 504. The HSS performs authentication determining according to the authentication request message.

The authentication determining may include: (1) determining whether the subscription data of the UE exists; (2) determining whether the UE is allowed to access a current network, that is, whether the type of the access network that the UE currently accesses is a type of restricted network; (3) determining whether a network indicated by the VPLMN allows the UE to access; (4) whether non-3GPP subscription data related to the UE exists; and the like.

Step 505. The HSS returns an authentication response message to the AAA server.

If the authentication performed by the HSS succeeds, (for example, the subscription data of the UE exists, the UE is allowed to access the current network, the UE is allowed to access the VPLMN, and the non-3GPP subscription data of the UE exists), the authentication response message includes the authentication vector of the UE. Otherwise, the authentication response message includes an authentication failure cause of the UE.

When it is determined that no subscription data of the UE exists, a corresponding authentication failure cause may be that "User does not exist", and a corresponding authentication failure cause value may be "DIAMETER_ERROR_USER_UNKNOWN".

When it is determined that the UE is not allowed to access the current network, a corresponding authentication failure cause may be that "Access type does not allow access", and a corresponding authentication failure cause value may be "DIAMETER_ERROR_RAT_TYPE_NOT_ALLOWED".

When it is determined that the UE is not allowed to access the VPLMN, a corresponding authentication failure cause may be that "VPLMN does not allow access", and a corresponding authentication failure cause value may be "DIAMETER_ERROR_ROAMING_NOT_ALLOWED".

When it is determined that no non-3GPP subscription data of the UE exists, a corresponding authentication failure cause may be that "Non-3GPP subscription data does not exist", and a corresponding authentication failure cause value may be "DIAMETER_ERROR_USER_NO_NON_3GPP_SUBSCRIPTION".

It should be noted that the subscription data may include the non-3GPP subscription data.

Step 506. When the authentication response message indicates that the UE fails to be authenticated, the AAA server sends an authentication failure cause of the UE to the UE.

Optionally, the AAA server may send the authentication failure cause of the UE to the UE by using an Extensible Authentication Protocol (EAP)-Authentication and Key Agreement Protocol (AKA) or EAP-AKA' message.

It should be noted that the EAP-AKA or EAP-AKA' message may be sent to the ePDG by the AAA server by using an authentication and authorization answer message, and then is sent to the UE by the ePDG by using an IKEv2 message. That is, the authentication and authorization answer message and the IKEv2 message include the EAP-AKA or EAP-AKA' message.

Optionally, the authentication failure cause of the UE may be sent to the UE by the ePDG by newly adding a cause value to the IKEv2 message. That is, the authentication and authorization answer message that is sent to the ePDG by the AAA server carries the authentication failure cause of the UE that is obtained from the HSS by the AAA server. Then, the ePDG sends the authentication failure cause to the UE by using the cause value that is newly added to the IKEv2 message.

After the UE receives the authentication failure cause of the UE, when the authentication failure cause is that an access network type does not allow access or the VPLMN does not allow access, the UE sends an IKE_AUTH request message to an access gateway different from the ePDG.

It should be noted that the IKE_AUTH request message may be considered as a connection request message.

Step 507. When the authentication response message indicates that the UE is authenticated successfully, the AAA server sends a non-3GPP access registration request message to the HSS.

The non-3GPP access registration request message includes the IMSI of the UE.

Optionally, before the AAA server sends the non-3GPP access registration request message to the HSS, the method may further include that the AAA server interacts with the UE according to the authentication vector included in the authentication response, to complete an authentication process for the UE.

Step 508. The HSS returns a non-3GPP access registration response message to the AAA server.

The non-3GPP access registration response message includes the subscription data of the UE.

Specifically, the HSS searches for the subscription data of the UE according to the IMSI of the UE included in the non-3GPP access registration request message, and returns the subscription data of the UE to the AAA server by using the non-3GPP access registration response message.

Optionally, the subscription data of the UE includes the target APN of the UE and information about an authorized access network type corresponding to the target APN of the UE.

Optionally, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

It should be noted that the authorized access network type is a type of an access network that the UE is allowed to access, and the non-authorized access network type is a type of an access network that the UE is not allowed to access.

Optionally, the access network type in the APN configuration parameter may include at least one of the following access network types:

WLAN, trusted WLAN, untrusted WLAN, CDMA2000, WiMAX, UMTS terrestrial radio access network (UTRAN), GSM EDGE radio access network (GERAN), or evolved universal terrestrial radio access network (EUTRAN).

Optionally, a WLAN access network type may further include: trusted WLAN and untrusted WLAN.

For example, with respect to a fact that the subscription data of the UE includes the information about the authorized access network type corresponding to the target APN of the UE, solutions are as follows:

Solution 1: An APN configuration parameter (APN-Configuration) corresponding to the target APN of the UE includes an authorized access network type (RAT-Permission). When there is more than one authorized access network type, the configuration parameter includes a list of authorized access network types. An implementation is as follows:

```
APN-Configuration ::= <AVP header: 1430 10415>
{ Context-Identifier }     // File identifier
{ PDN-Type }     // PDN type
[RAT-Permission]
``` where "Context-Identifier" is the file identifier corresponding to the target APN of the UE; "RAT-Permission" may include the authorized access network type corresponding to an APN (that is, the target APN) identified by the "Context-Identifier"; and when "RAT-Permission" includes the type of the access network that the UE currently accesses, it is determined that the target APN of the UE is authorized.

Alternatively, "RAT-Permission" may include a "match-all" indication, indicating that the target APN is authorized in any access network type; or when the configuration parameter does not include the "RAT-Permission", it indicates that the target APN is authorized in any access network type.

Solution 2: An APN configuration parameter corresponding to the target APN of the UE includes a non-authorized access network type (RAT-Forbidden). An implementation is as follows:

```
APN-Configuration ::= <AVP header: 1430 10415>
{ Context-Identifier }     // File identifier
{ PDN-Type }     // PDN type
[RAT-Forbidden]
``` where "Context-Identifier" is the file identifier corresponding to the target APN of the UE; "RAT-Forbidden" may include the non-authorized access network type corresponding to an APN (that is, the target APN of the UE) identified by the "Context-Identifier"; or when "RAT-Forbidden" corresponding to the target APN of the UE does not include the type of the access network that the UE currently accesses, it is determined that the target APN of the UE is authorized.

Optionally, when the configuration parameter does not include the "RAT-Forbidden", it indicates that the target APN of the UE is authorized in any access network type.

Solution 3: An APN configuration parameter corresponding to the target APN of the UE includes an authorization identifier corresponding to the type of the access network that the UE currently accesses. The authorization identifier is used to indicate that the target APN of the UE is authorized or not authorized in the type of the access network that the UE currently accesses. An implementation is as follows:

```
APN-Configuration ::= <AVP header: 1430 10415>
{ Context-Identifier }     // File identifier
{ PDN-Type }     // PDN type
[Vowifi-Permission]
``` where "Context-Identifier" is the file identifier corresponding to the target APN of the UE; "Vowifi-Permission" is an authorization identifier of an APN that is identified by the "Context-Identifier" (that is, the target APN of the UE) and that is in a type of WLAN access network that the UE currently accesses. For example, when "Vowifi-Permission" corresponding to the target APN of the UE is 1, it indicates that the target APN of the UE is authorized in the type of WLAN access network that the UE currently accesses; or when Vowifi-Permission" corresponding to the target APN of the UE is 0, it indicates that the target APN of the UE is not authorized in the type of WLAN access network that the UE currently accesses.

It should be noted that "Vowifi-Permission" is the authorization identifier corresponding to the WLAN in solution 3. In solution 3, when the type of the access network that the UE currently accesses is another access network type, the WLAN may be corresponding to another authorization identifier. A function of the other authorization identifier is similar to Vowifi-Permission, and Details are not further described herein.

Step 509. The AAA server determines, according to the type of the access network that the UE currently accesses and the information about the authorized access network type corresponding to the target APN of the UE, whether the target APN of the UE is authorized.

For example, when the type of the access network that the UE currently accesses is a WLAN, the target APN of the UE is an IP multimedia system (IMS), and the WLAN access network type is included in RAT-Permission in APN-configuration of the IMS, or the WLAN access network type is not included in RAT-forbidden, or Vowifi-Permission indicates that the UE is allowed in the WLAN access network type, it is determined that the IMS is authorized (authorization succeeds). Otherwise, it is determined that the IMS is not authorized (on a network side, the UE is rejected to use an IMS voice service over WLAN access).

It should be noted that, before step 509, the method may further include:

when it is determined that the target APN of the UE is not included in the subscription data of the UE, it is directly determined that the target APN of the UE is not authorized, and step 510 is performed instead of step 509; or when the subscription data of the UE includes the target APN of the UE, step 509 is performed to further determine whether the target APN of the UE is authorized in the type of the access network that the UE currently accesses; or when it is determined that the target APN of the UE is not included in the subscription data of the UE and the subscription data does not include a wild card APN, it is directly determined that the target APN of the UE is not authorized, and step 510 is performed instead of step 509; or when the subscription data of the UE includes the target APN of the UE (or the subscription data of the UE includes a wild card APN), step 509 is performed to further determine whether the target APN of the UE (or the wild card APN) is authorized in the type of the access network that the UE currently accesses.

Step 510. The AAA server returns an authentication and authorization answer message to the ePDG.

When the target APN of the UE is authorized, the authentication and authorization answer message includes an indication message indicating that the target APN of the UE is allowed; otherwise, the authentication and authorization answer message includes an authorization failure cause.

Optionally, the authorization failure cause is used to indicate that the target APN of the UE fails to be authorized or the target APN of the UE fails to be authorized in the type of the access network that the UE currently accesses.

Optionally, when the subscription data of the UE does not include the target APN of the UE, a corresponding authorization failure cause is used to indicate that the target APN of the UE fails to be authorized. When the subscription data of the UE includes the target APN of the UE, but the type of the access network that the UE currently accesses does not belong to the authorized access network type corresponding to the target APN of the UE, a corresponding authorization failure cause is used to indicate that the target APN of the UE fails to be authorized in the type of the access network that the UE currently accesses.

Step 511. The ePDG sends an IKEv2 message to the UE according to the authentication and authorization answer message.

When the authentication and authorization answer message includes the authorization failure cause of the target APN of the UE, the ePDG forwards the authorization failure cause to the UE by using the IKEv2 message.

Optionally, after receiving the authorization failure cause that is used to indicate that the target APN of the UE fails to be authorized in the type of the access network that the UE currently accesses, the UE sends another IKE_AUTH request message to the ePDG. The IKE_AUTH request message includes an APN requested by the UE, and the APN requested by the UE is different from the target APN.

In this embodiment, an HSS returns a non-3GPP access registration response message to an AAA server. The non-3GPP access registration response message includes subscription data of UE. The subscription data of the UE includes information about an authorized access network type corresponding to a target APN of the UE. The AAA server determines, according to a type of an access network that the UE currently accesses and the information about the authorized access network type corresponding to the target APN of the UE, whether the target APN of the UE is authorized. In this way, when performing APN authorization determining, the AAA server can consider both the target APN of the UE and the type of the access network that the UE currently accesses. This resolves a prior-art problem that, when APN authorization determining is performed, an operator cannot appropriately control an APN that the UE is allowed to access.

Figure 6:
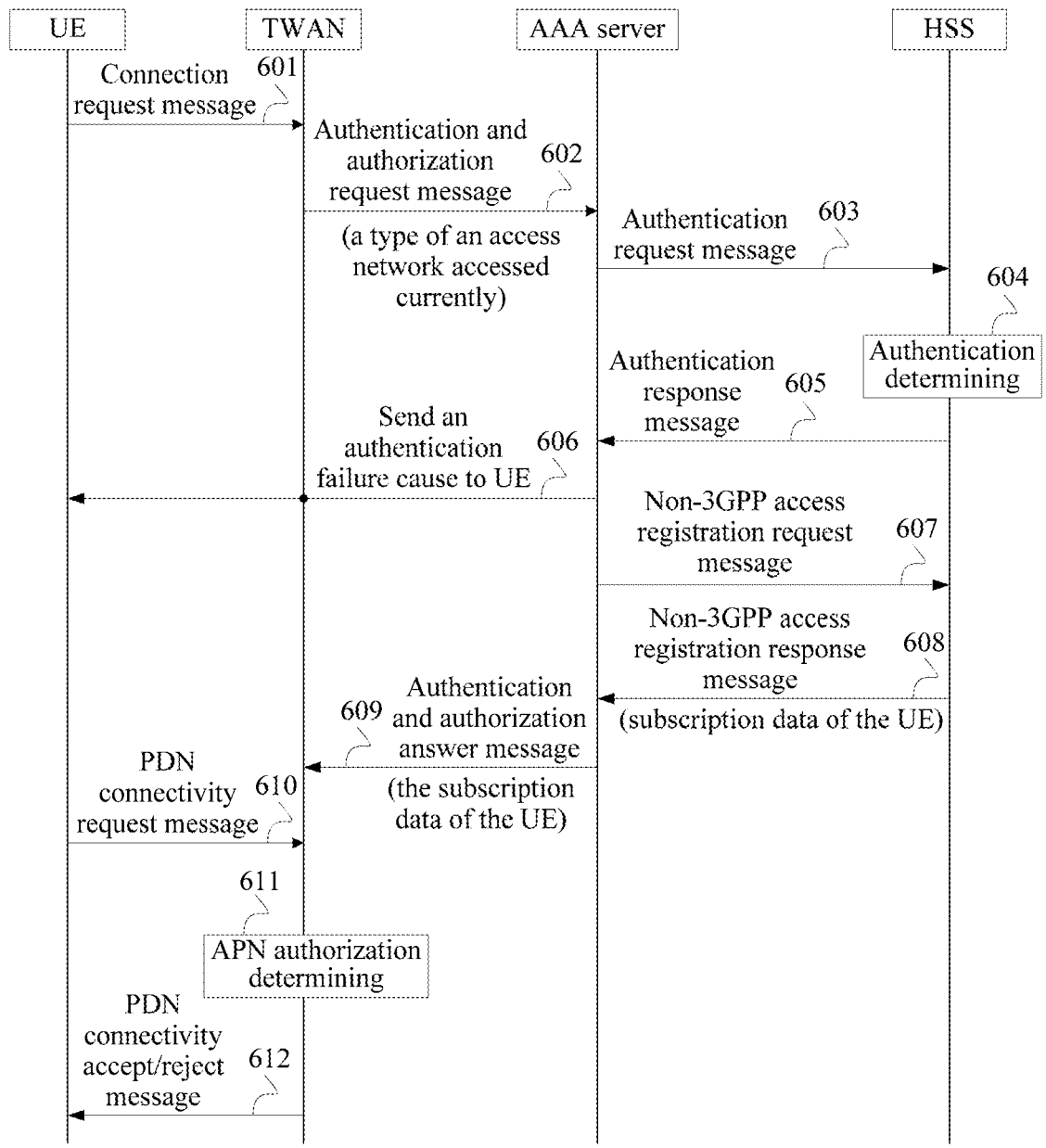
FIG. 6 is a flowchart of Embodiment 4 of an APN authorization method according to the present disclosure.

FIG. 6 is a flowchart of Embodiment 4 of an APN authorization method according to the present disclosure. As shown in FIG. 6, the method in this embodiment may include the following steps.

Step 601. UE sends, to a TWAN, a connection request message that is used to request the TWAN for a connection.

It should be noted that the connection request message is an existing message between the UE and the TWAN. Details are not further described herein.

Step 602. The TWAN sends an authentication and authorization request message to an AAA server.

It should be noted that step 602 is similar to step 502. Details are not further described herein.

Step 603. The AAA server sends an authentication request message to an HSS.

It should be noted that step 603 is similar to step 503. Details are not further described herein.

Step 604. The HSS performs authentication determining according to the authentication request message.

It should be noted that step 604 is similar to step 504. Details are not further described herein.

Step 605. The HSS returns an authentication response message to the AAA server.

It should be noted that step 605 is similar to step 505. Details are not further described herein.

Step 606. When the authentication response message indicates that the UE fails to be authenticated, the AAA server sends an authentication failure cause of the UE to the UE.

Optionally, the AAA server may send, to the UE, the authentication failure cause of the UE by using an EAP-AKA or EAP-AKA' message.

Optionally, the authentication failure cause of the UE may be sent to the UE by the TWAN by newly adding a cause value to a message between the TWAN and the UE.

It should be noted that step 606 is similar to step 506. Details are not further described herein.

Step 607. When the authentication response message indicates that the UE is authenticated successfully, the AAA server sends a non-3GPP access registration request message to the HSS.

Optionally, before the AAA server sends the non-3GPP access registration request message to the HSS, the method may further include that the AAA server interacts with the UE according to an authentication vector included in the authentication response, to complete an authentication process for the UE.

It should be noted that step 607 is similar to step 507. Details are not further described herein.

Step 608. The HSS returns a non-3GPP access registration response message to the AAA server.

It should be noted that step 608 is similar to step 508. Details are not further described herein.

Step 609. The AAA server returns an authentication and authorization answer message to the TWAN.

The authentication and authorization answer message includes subscription data of the UE.

Step 610. The UE sends a public data network (PDN) connectivity request (PDN CONNECTIVITY REQUEST) message to the TWAN.

Optionally, the PDN connectivity request message may include a target APN of the UE or may not include a target APN of the UE. When the PDN connectivity request does not include the target APN of the UE, the TWAN uses a default APN in the subscription data of the UE as the target APN of the UE.

It should be noted that there is no sequence between step 610 and steps 607 to 609. After the UE performs authentication interaction with the TWAN and the authentication succeeds, the UE may send the PDN connectivity request message to the TWAN.

Step 611. The TWAN determines, according to a type of an access network that the UE currently accesses and the information about the authorized access network type corresponding to the target APN of the UE, whether the target APN of the UE is authorized.

It should be noted that the method in step 611 in which the TWAN determines whether the target APN of the UE is authorized is similar to the method in step 509 in which the AAA server determines whether the target APN of the UE is authorized. Details are not further described herein.

Step 612. The TWAN sends a PDN connectivity accept (CONNECTIVITY ACCEPT) message or a PDN connectivity reject (PDN CONNECTIVITY REJECT) message to the UE.

Optionally, when the TWAN sends the PDN connectivity reject message to the UE, the message includes the authorization failure cause. The authorization failure cause is used to indicate that the target APN of the UE fails to be authorized in the type of the access network that the UE currently accesses.

Optionally, after receiving the authorization failure cause that is used to indicate that the target APN of the UE fails to be authorized in the type of the access network that the UE currently accesses, the UE sends another PDN CONNECTIVITY REQUEST message to the TWAN. The PDN CONNECTIVITY REQUEST message includes an APN requested by the UE, and the APN requested by the UE is different from the target APN.

In this embodiment, an AAA server returns an authentication and authorization answer message to a TWAN. The authentication and authorization answer message includes subscription data of UE. The subscription data of the UE includes information about an authorized access network type corresponding to a target APN of the UE. The TWAN determines, according to a type of an access network that the UE currently accesses and the information about the authorized access network type corresponding to the target APN of the UE, whether the target APN of the UE is authorized. In this way, when performing APN authorization determining, the TWAN can consider both the target APN of the UE and the type of the access network that the UE currently accesses. This resolves a prior-art problem that, when APN authorization determining is performed, an operator cannot appropriately control an APN that the UE is allowed to access.

Figure 7:
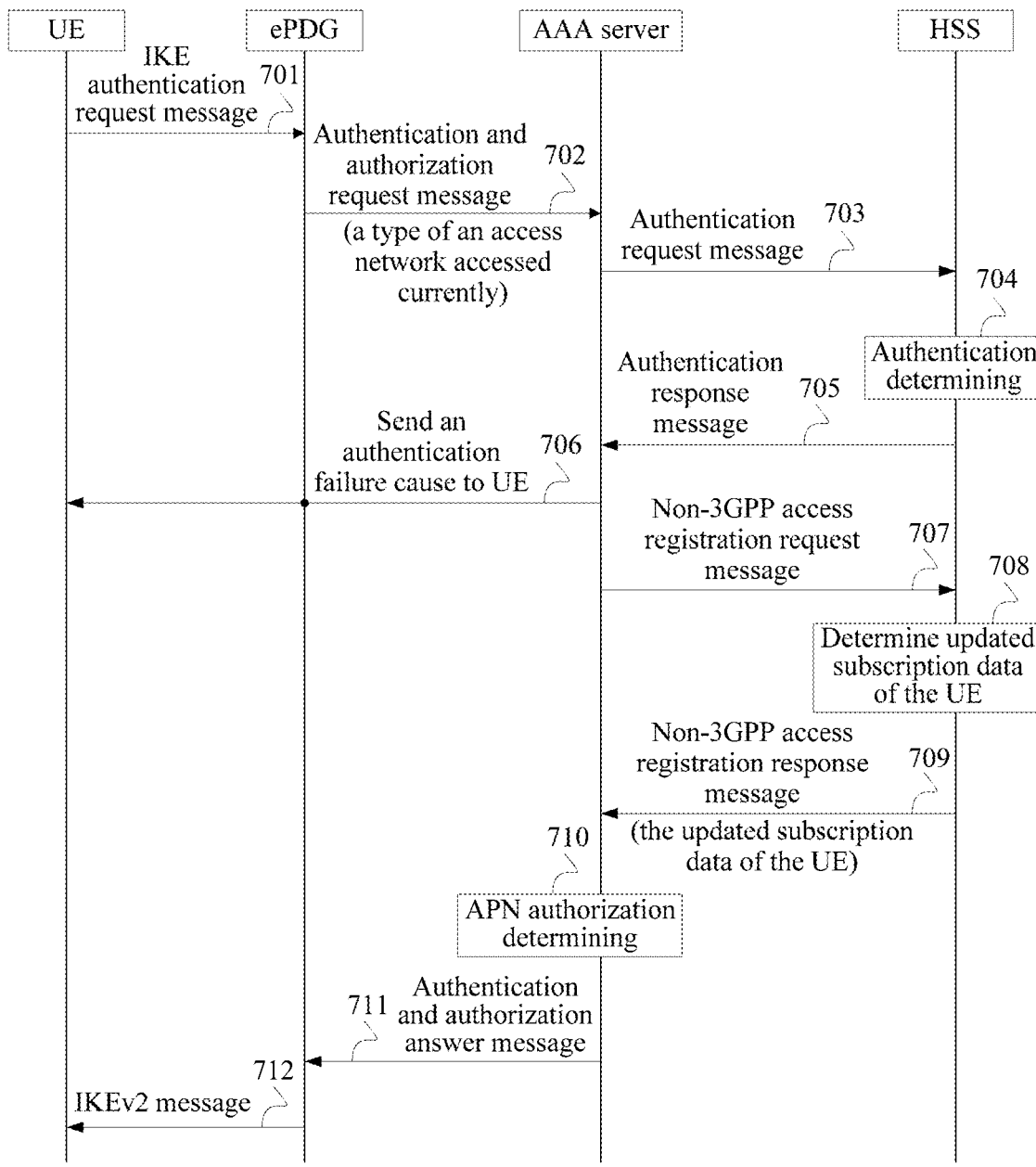
FIG. 7 is a flowchart of Embodiment 5 of an APN authorization method according to the present disclosure.

FIG. 7 is a flowchart of Embodiment 5 of an APN authorization method according to the present disclosure. As shown in FIG. 7, the method in this embodiment may include the following steps.

Step 701. UE sends an IKE authentication request message to an ePDG.

It should be noted that step 701 is similar to step 501. Details are not further described herein.

Step 702. The ePDG sends an authentication and authorization request message to an AAA server.

It should be noted that step 702 is similar to step 502. Details are not further described herein.

Step 703. The AAA server sends an authentication request message to an HSS.

It should be noted that step 703 is similar to step 503. Details are not further described herein.

Step 704. The HSS performs authentication determining according to the authentication request message.

It should be noted that step 704 is similar to step 504. Details are not further described herein.

Step 705. The HSS returns an authentication response message to the AAA server.

It should be noted that step 705 is similar to step 505. Details are not further described herein.

Step 706. When the authentication response message indicates that the UE fails to be authenticated, the AAA server sends an authentication failure cause of the UE to the UE.

It should be noted that step 706 is similar to step 506. Details are not further described herein.

Step 707. When the authentication response message indicates that the UE is authenticated successfully, the AAA server sends a non-3GPP access registration request message to the HSS.

It should be noted that step 707 is similar to step 507. Details are not further described herein.

Step 708. The HSS updates subscription data of the UE according to a type of an access network that the UE currently accesses, to obtain updated subscription data.

The subscription data of the UE includes at least one APN and information about an authorized access network type corresponding to the at least one APN. The updated subscription data of the UE includes information about an authorized APN in the type of the access network that the UE currently accesses.

Optionally, the HSS may determine the subscription data of the UE according to an IMSI of the UE included in the non-3GPP access registration request message.

Optionally, the subscription data of the UE includes the information about the authorized access network type corresponding to the at least one APN in the following manner:

an APN configuration parameter corresponding to each of the at least one APN in the subscription data includes the authorized access network type; or an APN configuration parameter corresponding to each of the at least one APN in the subscription data includes a non-authorized access network type; or an APN configuration parameter corresponding to each of the at least one APN in the subscription data includes an authorization identifier corresponding to the type of the access network that the UE currently accesses, where the authorization identifier is used to indicate that the APN corresponding to the APN configuration parameter is authorized or not authorized in the type of the access network that the UE currently accesses.

For example, solutions that the subscription data of the UE includes the information about the authorized access network type corresponding to the at least one APN are as follows:

Solution A: An APN configuration parameter (APN-Configuration) corresponding to each of the at least one APN includes an authorized access network type (RAT-Permission). When there is more than one authorized access network type, the configuration parameter includes a list of authorized access network types. An implementation is as follows:

```
APN-Configuration ::= <AVP header: 1430 10415>
{ Context-Identifier }    // File identifier
{ PDN-Type }    // PDN type
[RAT-Permission]
``` where "Context-Identifier" is a file identifier corresponding to an APN; and "RAT-Permission" may include an authorized access network type corresponding to the APN identified by the "Context-Identifier".

Alternatively, "RAT-Permission" may include a "match-all" indication, indicating that the APN identified by the "Context-Identifier" is authorized in any access network type; or when the configuration parameter does not include the "RAT-Permission", it indicates that the APN identified by the "Context-Identifier" is authorized in any access network type.

Solution B: An APN configuration parameter corresponding to each of the at least one APN includes a non-authorized access network type (RAT-Forbidden). An implementation is as follows:

```
APN-Configuration ::= <AVP header: 1430 10415>
{ Context-Identifier }    // File identifier
{ PDN-Type }              // PDN type
[RAT-Forbidden]
``` where "Context-Identifier" is a file identifier corresponding to an APN; and "RAT-Forbidden" may include a non-authorized access network type corresponding to the APN identified by the "Context-Identifier".

When the configuration parameter does not include the "RAT-Forbidden", it indicates that the APN identified by the "Context-Identifier" is authorized in any access network type.

Solution C: An APN configuration parameter corresponding to each of the at least one APN includes an authorization identifier corresponding to the type of the access network that the UE currently accesses. The authorization identifier is used to indicate that the APN corresponding to the APN configuration parameter is authorized or not authorized in the type of the access network that the UE currently accesses. An implementation is as follows:

```
APN-Configuration ::= <AVP header: 1430 10415>
{ Context-Identifier }    // File identifier
{ PDN-Type }              // PDN type
[Vowifi-Permission]
``` where "Context-Identifier" is a file identifier corresponding to the APN; and "Vowifi-Permission" is a corresponding authorization identity of the APN identified by the "Context-Identifier", in the type of WLAN access network that the UE currently accesses.

It should be noted that the solutions A, B, and C are similar to the solutions 1, 2, and 3 in the method embodiment shown in FIG. 5. An only difference lies in that the solutions A, B, and C are described specific to a target APN, while the solutions 1, 2, and 3 are described specific to each of at least one APN.

Optionally, the updating subscription data of the UE according to a type of an access network that the UE currently accesses, to obtain updated subscription data includes:

the HSS filters, according to the type of the access network that the UE currently accesses, the subscription data of the UE, to obtain the updated subscription data, so that the updated subscription data includes only the information about the authorized APN in the type of the access network that the UE currently accesses.

It should be noted that the HSS may obtain, according to the authentication request sent by the AAA server to the HSS in step 703, the type of the access network that the UE currently accesses. Alternatively, the non-3GPP access registration request sent by the AAA server in step 707 may include the type of the access network that the UE currently accesses.

Step 709. The HSS returns a non-3GPP access registration response message to the AAA server, where the non-3GPP access registration response message includes the updated subscription data.

Step 710. The AAA server determines, according to a target APN of the UE and the information about the authorized APN in the type of the access network that the UE currently accesses, whether the target APN of the UE is authorized.

Specifically, if determining, according to the information about the authorized APN in the type of the access network that the UE currently accesses, that the target APN of the UE belongs to the authorized APN in the type of the access network that the UE currently accesses, the AAA server determines that the target APN of the UE is authorized; or if determining, according to the information about the authorized APN in the type of the access network that the UE currently accesses, that the target APN of the UE does not belong to the authorized APN in the type of the access network that the UE currently accesses, the AAA server determines that the target APN of the UE is not authorized.

It should be noted that, when the authorized access network type corresponding to the at least one APN in step 708 does not include the type of the access network that the UE currently accesses, the information about the authorized APN in the type of the access network that the UE currently accesses included in the updated subscription data is empty.

When the authorized access network type corresponding to the at least one APN includes the type of the access network that the UE currently accesses, and the at least one APN does not include the target APN of the UE, the information about the authorized APN in the type of the access network that the UE currently accesses included in the updated subscription data is not empty (including an APN of the at least one APN), but the target APN of the UE is not included.

When the at least one APN includes the target APN of the UE, and the authorized access network type corresponding to the target APN of the UE includes the type of the access network that the UE currently accesses, the information about the authorized APN in the type of the access network that the UE currently accesses included in the updated subscription data is not empty, and the target APN of the UE is included.

Step 711. The AAA server returns an authentication and authorization answer message to the ePDG.

It should be noted that step 711 is similar to step 510. Details are not further described herein.

Step 712. The ePDG sends an IKEv2 message to the UE according to the authentication and authorization answer message.

It should be noted that step 712 is similar to step 511. Details are not further described herein.

In this embodiment, an HSS returns a non-3GPP access registration response message to an AAA server. The non-3GPP access registration response message includes updated subscription data of UE, and the updated subscription data includes information about an authorized APN in a type of an access network that the UE currently accesses. The AAA server determines, according to a target APN of the UE and the information about the authorized APN in the type of the access network that the UE currently accesses, whether the target APN of the UE is authorized. This resolves a prior-art problem that, when APN authorization determining is performed, an operator cannot appropriately control an APN that the UE is allowed to access.

Figure 8:
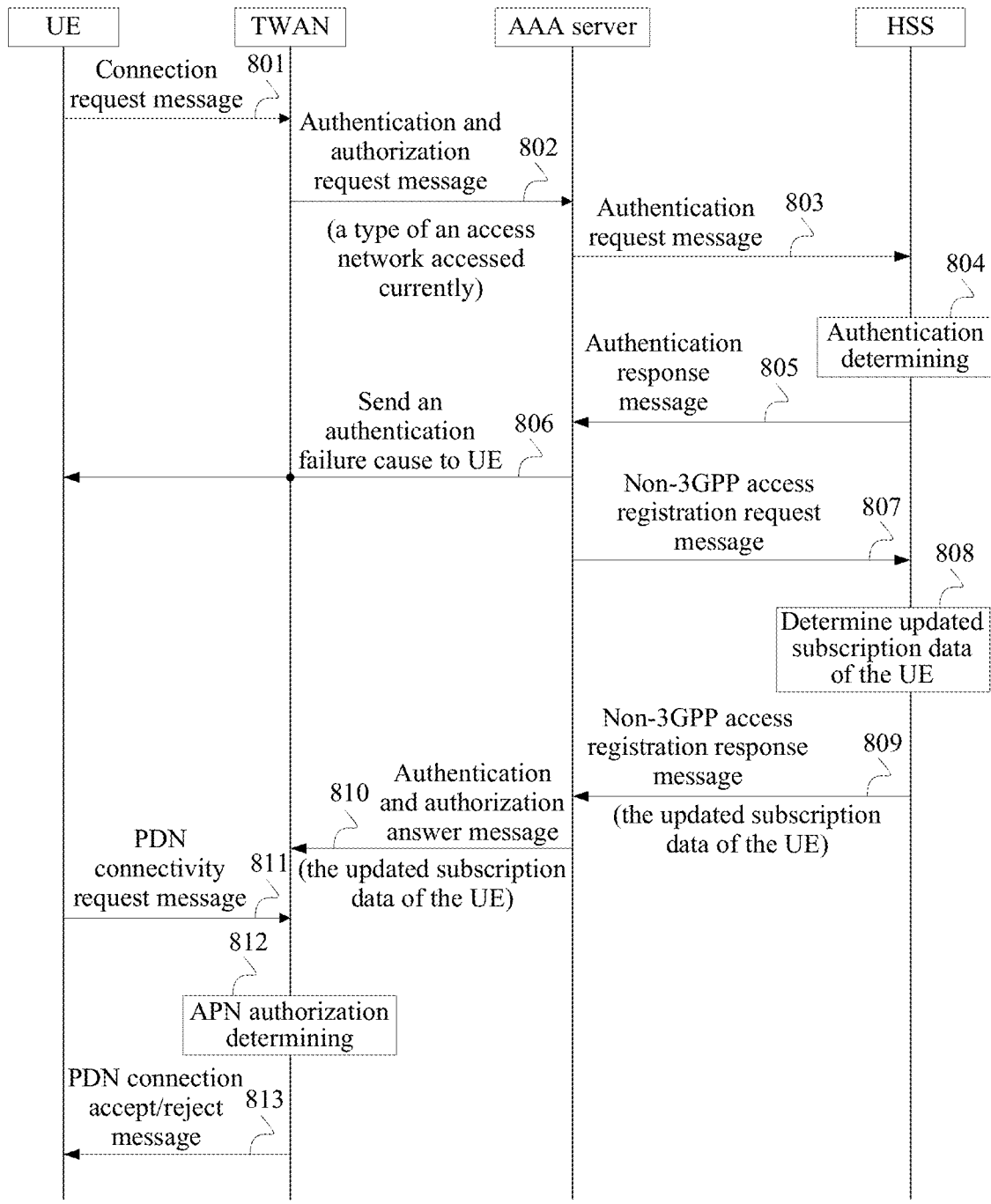
FIG. 8 is a flowchart of Embodiment 6 of an APN authorization method according to the present disclosure.

FIG. 8 is a flowchart of Embodiment 6 of an APN authorization method according to the present disclosure. As shown in FIG. 8, the method in this embodiment may include the following steps.

Step 801. UE sends a connection request message to a TWAN.

It should be noted that step 801 is similar to step 601. Details are not further described herein.

Step 802. The TWAN sends an authentication and authorization request message to an AAA server.

It should be noted that step 802 is similar to step 602. Details are not further described herein.

Step 803. The AAA server sends an authentication request message to an HSS.

It should be noted that step 803 is similar to step 603. Details are not further described herein.

Step 804. The HSS performs authentication determining according to the authentication request message.

It should be noted that step 804 is similar to step 604. Details are not further described herein.

Step 805. The HSS returns an authentication response message to the AAA server.

It should be noted that step 805 is similar to step 605. Details are not further described herein.

Step 806. When the authentication response message indicates that the UE fails to be authenticated, the AAA server sends an authentication failure cause of the UE to the UE.

It should be noted that step 806 is similar to step 606. Details are not further described herein.

Step 807. When the authentication response message indicates that the UE is authenticated successfully, the AAA server sends a non-3GPP access registration request message to the HSS.

It should be noted that step 807 is similar to step 607. Details are not further described herein.

Step 808. The HSS updates subscription data of the UE according to a type of an access network that the UE currently accesses, to obtain updated subscription data.

It should be noted that step 808 is similar to step 708. Details are not further described herein.

Step 809. The HSS returns a non-3GPP access registration response message to the AAA server, where the non-3GPP access registration response message includes the updated subscription data.

It should be noted that step 809 is similar to step 709. Details are not further described herein.

Step 810. The AAA server returns an authentication and authorization answer message to the TWAN.

The authentication and authorization answer message includes the updated subscription data.

Step 811. The UE sends a PDN connectivity request (PDN CONNECTIVITY REQUEST) message to the TWAN.

It should be noted that step 811 is similar to step 610. Details are not further described herein.

Step 812. The TWAN determines, according to a target APN of the UE and information about an authorized APN in the type of the access network that the UE currently accesses, whether the target APN of the UE is authorized.

It should be noted that the method in step 812 in which the TWAN determines whether the target APN of the UE is authorized is similar to the method in step 710 in which the AAA server determines whether the target APN of the UE is authorized. Details are not further described herein.

Step 813. The TWAN sends a PDN connectivity accept (CONNECTIVITY ACCEPT) message or a PDN connectivity reject message to the UE.

It should be noted that step 813 is similar to step 612. Details are not further described herein.

In this embodiment, an AAA server returns an authentication and authorization answer message to a TWAN. The authentication and authorization answer message includes updated subscription data of UE. The updated subscription data includes information about an authorized APN in a type of an access network that the UE currently accesses. The TWAN determines, according to a target APN of the UE and the information about the authorized APN in the type of the access network that the UE currently accesses, whether the target APN of the UE is authorized. This resolves a prior-art problem that, when APN authorization determining is performed, an operator cannot appropriately control an APN that the UE is allowed to access.

Figure 9:
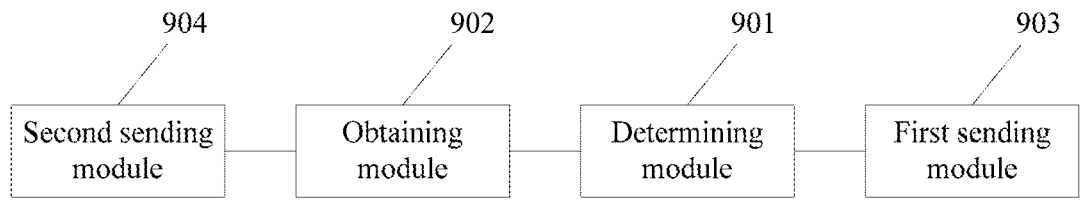
FIG. 9 is a schematic structural diagram of Embodiment 1 of an APN authorization apparatus according to the present disclosure.

FIG. 9 is a schematic structural diagram of Embodiment 1 of an APN authorization apparatus according to the present disclosure. The apparatus is a network device. As shown in FIG. 9, the apparatus in this embodiment may include a determining module 901 and an obtaining module 902. The determining module 901 is configured to determine a target APN of user equipment UE and a type of an access network that the UE currently accesses. The obtaining module 902 is configured to obtain information about an authorized access network type corresponding to the target APN of the UE. The determining module 901 is further configured to determine, according to the type of the access network that the UE currently accesses and the information about the authorized access network type corresponding to the target APN of the UE, whether the target APN of the UE is authorized.

Optionally, the network device is an AAA server or a non-3GPP access gateway.

Optionally, the determining module 901 is specifically configured to:

if determining, according to the information about the authorized access network type corresponding to the target APN of the UE, that the type of the access network that the UE currently accesses belongs to the authorized access network type corresponding to the target APN of the UE, determine that the target APN of the UE is authorized; or if determining, according to the information about the authorized access network type corresponding to the target APN of the UE, that the type of the access network that the UE currently accesses does not belong to the authorized access network type corresponding to the target APN of the UE, determine that the target APN of the UE is not authorized.

Optionally, the determining module 901 is further configured to determine that subscription data of the UE includes the target APN of the UE.

Optionally, the apparatus may further include a first transmitter 903.

If the determining module 901 determines, according to the type of the access network that the UE currently accesses and the information about the authorized access network type corresponding to the target APN of the UE, that the target APN of the UE is not authorized, the first transmitter 903 is configured to send an authorization failure cause to the UE. The authorization failure cause is used to indicate that the target APN of the UE fails to be authorized in the type of the access network that the UE currently accesses.

Optionally, the obtaining module 902 is specifically configured to receive the subscription data of the UE sent by a home subscriber server HSS. The subscription data of the UE includes the information about the authorized access network type corresponding to the target APN of the UE.

Optionally, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

Further, optionally, the apparatus may further include a second transmitter 904.

If the network device is an AAA server, the obtaining module 902 is further configured to receive an authentication response message sent by the HSS. The authentication response message includes an authentication failure cause of the UE.

The second transmitter 904 is configured to send the authentication failure cause of the UE to the UE.

The apparatus in this embodiment can be configured to execute technical solutions of the method embodiment shown in FIG. 3, the method embodiment on an AAA side shown in FIG. 5, and the method embodiment on a TWAN side shown in FIG. 6. An implementation principle and a technical effect in this apparatus embodiment are similar to those in the method embodiments shown in FIG. 3, the method embodiment on the AAA side shown in FIG. 5, and the method embodiment on the TWAN side shown in FIG. 6. Details are not further described herein.

Figure 10:
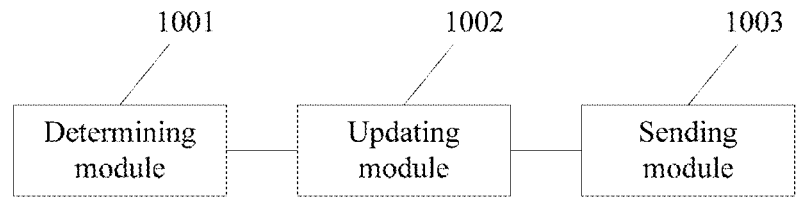
FIG. 10 is a schematic structural diagram of Embodiment 2 of an APN authorization apparatus according to the present disclosure.

FIG. 10 is a schematic structural diagram of Embodiment 2 of an APN authorization apparatus according to the present disclosure. The apparatus is an HSS. As shown in FIG. 10, the apparatus in this embodiment may include a determining module 1001, an updating module 1002, and a transmitter 1003. The determining module 1001 is configured to determine a type of an access network that user equipment UE currently accesses. The updating module 1002 is configured to update subscription data of the UE according to the type of the access network that the UE currently accesses, to obtain updated subscription data. The subscription data of the UE includes at least one APN and information about an authorized access network type corresponding to the at least one APN. The updated subscription data includes information about an authorized APN in the type of the access network that the UE currently accesses. The transmitter 1003 is configured to send the updated subscription data to a network device.

Optionally, the subscription data of the UE includes the information about the authorized access network type corresponding to the at least one APN in the following manner:

an APN configuration parameter corresponding to each of the at least one APN in the subscription data includes the authorized access network type; or an APN configuration parameter corresponding to each of the at least one APN in the subscription data includes a non-authorized access network type; or an APN configuration parameter corresponding to each of the at least one APN in the subscription data includes an authorization identifier corresponding to the type of the access network that the UE currently accesses, where the authorization identifier is used to indicate that the APN corresponding to the APN configuration parameter is authorized or not authorized in the type of the access network that the UE currently accesses.

The apparatus in this embodiment can be configured to execute the technical solutions of the method embodiment shown in FIG. 4, the method embodiments on an HSS side shown in FIG. 7 and FIG. 8. An implementation principle and a technical effect in this apparatus embodiment are similar to those in the method embodiment shown in FIG. 4 and the method embodiments on the HSS side shown in FIG. 7 and FIG. 8. Details are not further described herein.

Figure 11:
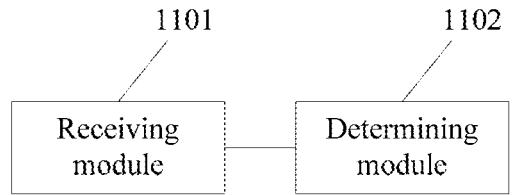
FIG. 11 is a schematic structural diagram of Embodiment 3 of an APN authorization apparatus according to the present disclosure.

FIG. 11 is a schematic structural diagram of Embodiment 3 of an APN authorization apparatus according to the present disclosure. The apparatus is a network device. As shown in FIG. 11, the apparatus in this embodiment may include a receiver 1101 and a determining module 1102. The receiver 1101 is configured to receive updated subscription data sent by a home subscriber server HSS. The updated subscription data includes information about an authorized APN in a type of an access network that the user equipment UE currently accesses. The determining module 1102 is configured to determine, according to a target APN of the UE and the information about the authorized APN in the type of the access network that the UE currently accesses, whether the target APN of the UE is authorized.

Optionally, the determining module 1102 is specifically configured to:

if determining, according to the information about the authorized APN in the type of the access network that the UE currently accesses, that the target APN of the UE belongs to the authorized APN in the type of the access network that the UE currently accesses, determine that the target APN of the UE is authorized; or if determining, according to the information about the authorized APN in the type of the access network that the UE currently accesses, that the target APN of the UE does not belong to the authorized APN in the type of the access network that the UE currently accesses, determine that the target APN of the UE is not authorized.

The apparatus in this embodiment can be configured to execute the technical solutions of the method embodiments on a network device side shown in FIG. 7 and FIG. 8. An implementation principle and a technical effect in this apparatus embodiment are similar to those in the method embodiments on the network device side shown in FIG. 7 and FIG. 8. Details are not further described herein.

Figure 12:
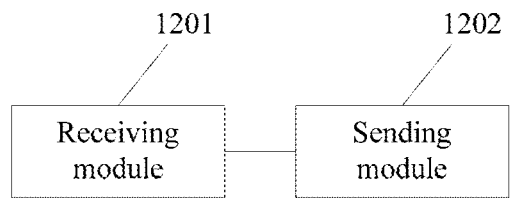
FIG. 12 is a schematic structural diagram of Embodiment 4 of an APN authorization apparatus according to the present disclosure.

FIG. 12 is a schematic structural diagram of Embodiment 4 of an APN authorization apparatus according to the present disclosure. The apparatus is UE. As shown in FIG. 12, the apparatus in this embodiment may include a receiver 1201 and a transmitter 1202. The receiver 1201 is configured to receive an authorization failure cause sent by a network device. The authorization failure cause is used to indicate that a target APN of the UE fails to be authorized in a type of an access network that the UE currently accesses. The transmitter 1202 is configured to send a first connection request message to a gateway of the access network that the UE currently accesses. The first connection request message includes an APN requested by the UE, and the APN requested by the UE is different from the target APN.

Optionally, the receiver 1201 is further configured to receive an authentication failure cause of the UE sent by the network device. The authentication failure cause includes that an access network type does not allow access or a visited public land mobile network VPLMN does not allow access. The transmitter 1202 is further configured to send a second connection request message to a gateway different from the gateway of the access network that the UE currently accesses.

The apparatus in this embodiment can be configured to execute the technical solutions of the method embodiments on a UE side shown in FIG. 5 to FIG. 8. An implementation principle and a technical effect in this apparatus embodiment are similar to those in the method embodiments on the UE side shown in FIG. 5 to FIG. 8. Details are not further described herein.

The present disclosure further provides an APN authorization system, including the network device in APN authorization apparatus Embodiment 1 and UE.

Optionally, the UE may be the UE in APN authorization apparatus Embodiment 4.

The system in this embodiment can be configured to execute the technical solution of the method embodiment shown in FIG. 5 or FIG. 6. An implementation principle and a technical effect in this system embodiment are similar to those in the method embodiment shown in FIG. 5 or FIG. 6. Details are not further described herein.

The present disclosure further provides another APN authorization system, including the HSS in APN authorization apparatus Embodiment 2, the network device in APN authorization apparatus Embodiment 3, and UE.

Optionally, the UE may be the UE in APN authorization apparatus Embodiment 4.

The apparatus in this embodiment can be configured to execute the technical solution of the method embodiment shown in FIG. 7 or FIG. 8. An implementation principle and a technical effect in this apparatus embodiment are similar to those in the method embodiment shown in FIG. 7 or FIG. 8. Details are not further described herein.

Figure 13:
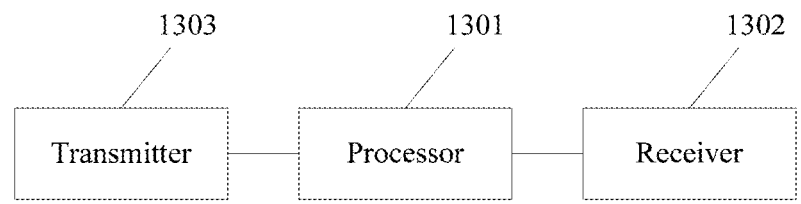
FIG. 13 is a schematic structural diagram of Embodiment 5 of an APN authorization apparatus according to the present disclosure.

FIG. 13 is a schematic structural diagram of Embodiment 5 of an APN authorization apparatus according to the present disclosure. The apparatus is a network device. As shown in FIG. 13, the apparatus in this embodiment may include a processor 1301 and a receiver 1302. The processor 1301 is configured to determine a target APN of user equipment UE and a type of an access network that the UE currently accesses. The receiver 1302 is configured to obtain information about an authorized access network type corresponding to the target APN of the UE. The processor 1301 is further configured to determine, according to the type of the access network that the UE currently accesses and the information about the authorized access network type corresponding to the target APN of the UE, whether the target APN of the UE is authorized.

Optionally, the network device is an AAA server or a non-3GPP access gateway.

Optionally, the processor 1301 is specifically configured to:

if determining, according to the information about the authorized access network type corresponding to the target APN of the UE, that the type of the access network that the UE currently accesses belongs to the authorized access network type corresponding to the target APN of the UE, determine that the target APN of the UE is authorized; or if determining, according to the information about the authorized access network type corresponding to the target APN of the UE, that the type of the access network that the UE currently accesses does not belong to the authorized access network type corresponding to the target APN of the UE, determine that the target APN of the UE is not authorized.

Optionally, the processor 1301 is further configured to determine that subscription data of the UE includes the target APN of the UE.

Optionally, the apparatus may further include a transmitter 1303.

If the processor 1301 determines, according to the type of the access network that the UE currently accesses and the information about the authorized access network type corresponding to the target APN of the UE, that the target APN of the UE is not authorized, the transmitter 1303 is configured to send an authorization failure cause to the UE. The authorization failure cause is used to indicate that the target APN of the UE fails to be authorized in the type of the access network that the UE currently accesses.

Optionally, the receiver 1302 is specifically configured to receive the subscription data of the UE sent by a home subscriber server HSS. The subscription data of the UE includes the information about the authorized access network type corresponding to the target APN of the UE.

Optionally, the subscription data of the UE includes the information about the authorized access network type corresponding to the target APN of the UE in the following manner:

an APN configuration parameter corresponding to the target APN of the UE in the subscription data includes the authorized access network type; or an APN configuration parameter corresponding to the target APN of the UE in the subscription data includes a non-authorized access network type; or an APN configuration parameter corresponding to the target APN of the UE in the subscription data includes an authorization identifier corresponding to the type of the access network that the UE currently accesses, where the authorization identifier is used to indicate that the target APN of the UE is authorized or not authorized in the type of the access network that the UE currently accesses.

Further, optionally, if the network device is an AAA server, the receiver 1302 is further configured to receive an authentication response message sent by the HSS. The authentication response message includes an authentication failure cause of the UE.

The transmitter 1303 is further configured to send the authentication failure cause of the UE to the UE.

The apparatus in this embodiment can be configured to execute technical solutions of the method embodiment shown in FIG. 3, the method embodiment on an AAA side shown in FIG. 5, and the method embodiment on a TWAN side shown in FIG. 6. An implementation principle and a technical effect in this apparatus embodiment are similar to those in the method embodiments shown in FIG. 3, the method embodiment on the AAA side shown in FIG. 5, and the method embodiment on the TWAN side shown in FIG. 6. Details are not further described herein.

Figure 14:
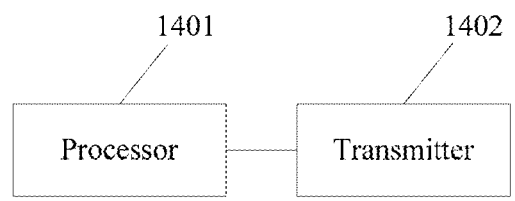
FIG. 14 is a schematic structural diagram of Embodiment 6 of an APN authorization apparatus according to the present disclosure.

FIG. 14 is a schematic structural diagram of Embodiment 6 of an APN authorization apparatus according to the present disclosure. The apparatus is an HSS. As shown in FIG. 14, the apparatus in this embodiment may include a processor 1401 and a transmitter 1402. The processor 1401 is configured to determine a type of an access network that user equipment UE currently accesses. The processor 1401 is configured to update subscription data of the UE according to the type of the access network that the UE currently accesses, to obtain updated subscription data. The subscription data of the UE includes at least one APN and information about an authorized access network type corresponding to the at least one APN. The updated subscription data includes information about an authorized APN in the type of the access network that the UE currently accesses. The transmitter 1402 is configured to send the updated subscription data to a network device.

Optionally, the subscription data of the UE includes the information about the authorized access network type corresponding to the at least one APN in the following manner:

an APN configuration parameter corresponding to each of the at least one APN in the subscription data includes the authorized access network type; or an APN configuration parameter corresponding to each of the at least one APN in the subscription data includes a non-authorized access network type; or an APN configuration parameter corresponding to each of the at least one APN in the subscription data includes an authorization identifier corresponding to the type of the access network that the UE currently accesses, where the authorization identifier is used to indicate that the APN corresponding to the APN configuration parameter is authorized or not authorized in the type of the access network that the UE currently accesses.

The apparatus in this embodiment can be configured to execute the technical solutions of the method embodiment shown in FIG. 4, the method embodiments on an HSS side shown in FIG. 7 and FIG. 8. An implementation principle and a technical effect in this apparatus embodiment are similar to those in the method embodiment shown in FIG. 4 and the method embodiments on the HSS side shown in FIG. 7 and FIG. 8. Details are not further described herein.

Figure 15:
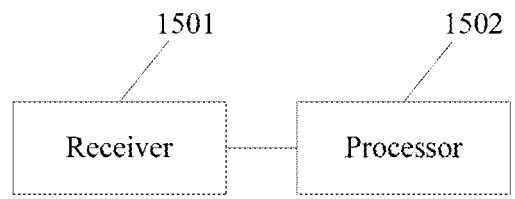
FIG. 15 is a schematic structural diagram of Embodiment 7 of an APN authorization apparatus according to the present disclosure.

FIG. 15 is a schematic structural diagram of Embodiment 7 of an APN authorization apparatus according to the present disclosure. The apparatus is a network device. As shown in FIG. 15, the apparatus in this embodiment may include a receiver 1501 and a processor 1502. The receiver 1501 is configured to receive updated subscription data sent by a home subscriber server HSS. The updated subscription data includes information about an authorized APN in a type of an access network that the user equipment UE currently accesses. The processor 1502 is configured to determine, according to a target APN of the UE and the information about the authorized APN in the type of the access network that the UE currently accesses, whether the target APN of the UE is authorized.

Optionally, the processor 1502 is specifically configured to:

if determining, according to the information about the authorized APN in the type of the access network that the UE currently accesses, that the target APN of the UE belongs to the authorized APN in the type of the access network that the UE currently accesses, determine that the target APN of the UE is authorized; or if determining, according to the information about the authorized APN in the type of the access network that the UE currently accesses, that the target APN of the UE does not belong to the authorized APN in the type of the access network that the UE currently accesses, determine that the target APN of the UE is not authorized.

The apparatus in this embodiment can be configured to execute the technical solutions of the method embodiments on a network device side shown in FIG. 7 and FIG. 8. An implementation principle and a technical effect in this apparatus embodiment are similar to those in the method embodiments on the network device side shown in FIG. 7 and FIG. 8. Details are not further described herein.

Figure 16:
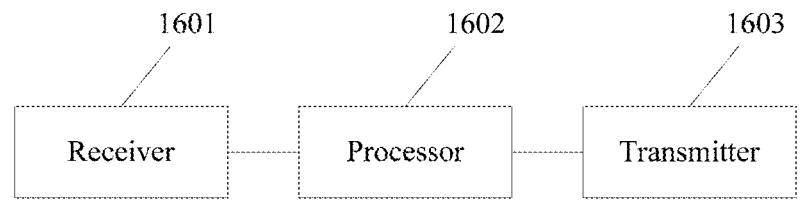
FIG. 16 is a schematic structural diagram of Embodiment 8 of an APN authorization apparatus according to the present disclosure.

FIG. 16 is a schematic structural diagram of Embodiment 8 of an APN authorization apparatus according to the present disclosure. The apparatus is UE. As shown in FIG. 16, the apparatus in this embodiment may include a receiver 1601, a processor 1602, and a transmitter 1603. The receiver 1601 is configured to receive an authorization failure cause sent by a network device. The authorization failure cause is used to indicate that a target APN of the UE fails to be authorized in a type of an access network that the UE currently accesses. The processor 1602 is configured to generate a first connection request message according to the authorization failure cause that is received by the receiver 1601. The first connection request message includes an APN requested by the UE, and the APN requested by the UE is different from the target APN. The transmitter 1603 is configured to send the first connection request message that is generated by the processor 1602 to a gateway of the access network that the UE currently accesses.

Optionally, the receiver 1601 is further configured to receive an authentication failure cause of the UE sent by the network device. The authentication failure cause includes that an access network type does not allow access or a visited public land mobile network VPLMN does not allow access. The processor 1602 is further configured to generate a second connection request message according to the authentication failure cause of the UE that is received by the receiver 1601. The transmitter 1603 is further configured to send the second connection request message that is generated by the processor 1602 to a gateway different from the gateway of the access network that the UE currently accesses.

The apparatus in this embodiment can be configured to execute the technical solutions of the method embodiments on a UE side shown in FIG. 5 to FIG. 8. An implementation principle and a technical effect in this apparatus embodiment are similar to those in the method embodiments on the UE side shown in FIG. 5 to FIG. 8. Details are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An access point name (APN) authorization method, comprising:

receiving, by a network device, a connection request message from a user equipment (UE), wherein the connection request message requests access to a target APN, wherein the network device comprises a non-3rd Generation Partnership Project (non-3GPP) access gateway;

obtaining, by the non-3GPP access gateway, information about an authorized access network type corresponding to the target APN of the UE, wherein the information includes subscription data reflecting a relationship between the target APN that the UE is allowed to access and a type of access network that the UE currently accesses; and determining, by the non-3GPP access gateway according to the type of access network that the UE currently accesses and the information about the authorized access network type corresponding to the target APN of the UE, whether the target APN of the UE is authorized in the type of access network that the UE currently accesses, wherein when the non-3GPP access gateway determines that the target APN of the UE is not authorized, the method further comprises sending, by the non-3GPP access gateway, an Extensible Authentication Protocol (EAP)-Authentication and Key Agreement Protocol (AKA) message to the UE, wherein the EAP-AKA message includes an authorization failure cause indicating that the target APN of the UE fails to be authorized in the type of the non-3GPP access network that the UE currently accesses, and wherein the authorization failure cause is a Diameter protocol value.

2. The method of claim 1, wherein the information about the authorized access network type corresponding to the target APN of the UE identifies different types of access networks, and wherein determining whether the target APN of the UE is authorized comprises:

determining whether the type of access network that the UE currently accesses matches one of the different types of access networks identified by the information about the authorized access network type corresponding to the target APN of the UE;

determining, by the non-3GPP access gateway, that the target APN of the UE is authorized based on the type of the non-3GPP access network that the UE currently accesses matching at least one of the different types of access networks; and determining, by the non-3GPP access gateway, that the target APN of the UE is not authorized based on the type of the non-3GPP access network that the UE currently accesses not matching any of the different types of access networks.

3. The method of claim 1, wherein before determining whether the target APN of the UE is authorized, the method further comprises determining, by the non-3GPP access gateway, that the subscription data of the UE comprises the target APN of the UE.

4. The method of claim 1, wherein obtaining, by the non-3GPP access gateway, the information about the authorized access network type corresponding to the target APN of the UE comprises receiving, by the non-3GPP access gateway, the subscription data of the UE from a home subscriber server (HSS), and wherein the non-3GPP access gateway comprises a high rate packet data (HRPD) serving gateway (HS-GW).

5. The method of claim 4, wherein the information about the authorized access network type corresponding to the target APN of the UE comprises:

an APN configuration parameter corresponding to the target APN of the UE and comprising the authorized access network type;

an APN configuration parameter corresponding to the target APN of the UE and comprising a non-authorized access network type; or an APN configuration parameter corresponding to the target APN of the UE and comprising an authorization identifier corresponding to the type of access network that the UE currently accesses, wherein the authorization identifier is used to indicate that the target APN of the UE is authorized or not authorized in the type of access network that the UE currently accesses.

6. The method of claim 4, wherein before receiving the subscription data of the UE from the HSS, the method further comprises:

receiving, by the non-3GPP access gateway, an authentication response message sent by the HSS, wherein the authentication response message comprises an authentication failure cause of the UE; and sending, by the non-3GPP access gateway, the authentication failure cause of the UE to the UE.

7. The method of claim 1, wherein the type of the non-3GPP access network the UE currently accesses is selected from multiple types of non-3GPP access networks including a Code Division Multiple Access (CDMA) 2000 access network, a Worldwide Interoperability for Microwave Access (WiMAX) access network, or a Wireless Local Area Network (WLAN) access network, wherein the non-3GPP access gateway determines that the target APN of the UE is authorized when the type of the non-3GPP access network that the UE currently accesses is a first of the multiple types of the non-3GPP access networks, and wherein the non-3GPP access gateway determines that the target APN is not authorized when the type of the non-3GPP access network that the UE currently accesses is a second of the multiple types of the non-3GPP access networks.

8. The method of claim 1, further comprising:

receiving, by the non-3GPP access gateway, updated subscription data about an authorized APN in the type of access network that the UE currently accesses;

determining, by the non-3GPP access gateway, that the target APN is authorized if the target APN of the UE belongs to the authorized APN in the type of access network that the UE currently accesses.

9. The method of claim 1, wherein the connection request message from the UE is an Internet Key Exchange (IKE) authentication request message.

10. An access point name (APN) authorization apparatus, wherein the apparatus is a network device that comprises an access gateway, and wherein the apparatus comprises:

a processor configured to determine a target APN of a user equipment (UE); and a receiver coupled to the processor and configured to obtain information about an authorized access network type corresponding to the target APN of the UE, wherein the information includes subscription data reflecting a relationship between the target APN that the UE is allowed to access and a type of access network that the UE currently accesses, wherein the processor is further configured to determine, according to the type of the access network the UE currently accesses and the subscription data, whether the target APN of the UE is authorized in the type of the access network that the UE currently accesses, wherein the apparatus further comprises a transmitter coupled to the processor, and wherein when the processor determines that the target APN of the UE is not authorized, the transmitter is configured to send an authorization failure cause to the UE indicating that the target APN of the UE fails to be authorized in the type of access network that the UE currently accesses.

11. The apparatus of claim 10, wherein the processor is further configured to:

determine that the target APN of the UE is authorized when the type of access network that the UE currently accesses belongs to the authorized access network type corresponding to the target APN of the UE; and determine that the target APN of the UE is not authorized when the type of access network that the UE currently accesses does not belong to the authorized access network type corresponding to the target APN of the UE.

12. The apparatus of claim 10, wherein the processor is further configured to determine that the subscription data of the UE comprises the target APN of the UE.

13. The apparatus of claim 10, wherein the receiver is further configured to receive the subscription data of the UE from a home subscriber server (HSS), and wherein the subscription data of the UE comprises the information about the authorized access network type corresponding to the target APN of the UE.

14. The apparatus of claim 13, wherein the information about the authorized access network type corresponding to the target APN of the UE comprises:
- an APN configuration parameter corresponding to the target APN of the UE and comprising the authorized access network type;
- an APN configuration parameter corresponding to the target APN of the UE and comprising a non-authorized access network type; or
- an APN configuration parameter corresponding to the target APN of the UE and comprising an authorization identifier corresponding to the type of access network the UE currently accesses, wherein the authorization identifier is used to indicate that the target APN of the UE is authorized or not authorized in the type of access network that the UE currently accesses.

15. The apparatus of claim 13, wherein the receiver is further configured to receive an authentication response message from the HSS, wherein the authentication response message comprises an authentication failure cause of the UE, and wherein the transmitter is configured to send the authentication failure cause of the UE to the UE.

16. An access point name (APN) authorization apparatus, wherein the apparatus is a user equipment (UE), and the apparatus comprises:
- a receiver configured to receive an Internet Key Exchange (IKE) version 2 (IKEv2) message from a network device, wherein the IKEv2 message comprises a newly added authorization failure cause value that indicates that a target APN of the UE fails to be authorized based on a type of access network the UE currently accesses, wherein the network device comprises a non-3rd Generation Partnership Project (non-3GPP) access gateway; and
- a transmitter coupled to the receiver and configured to send a first connection request message to an access gateway different than the non-3GPP access gateway, wherein the first connection request message comprises an APN that is requested by the UE and that is different than the target APN,
wherein the receiver is further configured to receive an authentication failure cause of the UE from the non-3GPP access gateway, wherein the authentication failure cause comprises that an access network type does not allow access or a visited public land mobile network (VPLMN) does not allow access, and wherein the transmitter is further configured to send a second connection request message to a gateway different than the gateway of the non-3GPP access network the UE currently accesses.

17. The apparatus of claim 16, wherein the type of the non-3GPP access network the UE currently accesses is selected from multiple types of non-3GPP access networks including a Code Division Multiple Access (CDMA) 2000 access network, a Worldwide Interoperability for Microwave Access (WiMAX) access network, or a Wireless Local Area Network (WLAN) access network, wherein the receiver is configured to receive the authorization failure cause when the access network that the UE currently accesses is a first of the multiple types of non-3GPP access networks, and wherein the receiver is configured to receive an authentication success message when the access network that the UE currently accesses is a second of the multiple types of non-3GPP access networks.

* * * * *